(12) United States Patent
Li et al.

(10) Patent No.: US 11,924,099 B2
(45) Date of Patent: Mar. 5, 2024

(54) METHOD FOR FORWARDING PACKET IN HYBRID NETWORK, DEVICE, AND SYSTEM

(71) Applicant: Huawei Technologies Co., Ltd., Shenzhen (CN)

(72) Inventors: Cheng Li, Beijing (CN); Zhenbin Li, Beijing (CN); Yang Xia, Beijing (CN); Taixu Tian, Dongguan (CN)

(73) Assignee: HUAWEI TECHNOLOGIES CO, LTD., Shenzhen (CN)

( * ) Notice: Subject to any disclaimer, the term of this patent is extended or adjusted under 35 U.S.C. 154(b) by 308 days.

(21) Appl. No.: 17/171,429

(22) Filed: Feb. 9, 2021

(65) Prior Publication Data

US 2021/0250288 A1  Aug. 12, 2021

(30) Foreign Application Priority Data

Feb. 10, 2020 (CN) .......................... 202010085223.8

(51) Int. Cl.
*H04L 45/74* (2022.01)
*H04L 45/00* (2022.01)
*H04L 45/50* (2022.01)

(52) U.S. Cl.
CPC .............. *H04L 45/74* (2013.01); *H04L 45/34* (2013.01); *H04L 45/50* (2013.01); *H04L 2212/00* (2013.01)

(58) Field of Classification Search
None
See application file for complete search history.

(56) References Cited

U.S. PATENT DOCUMENTS

2020/0127913 A1\* 4/2020 Filsfils .................... H04L 45/50

FOREIGN PATENT DOCUMENTS

CN  112583745 A  3/2021

OTHER PUBLICATIONS

Hui, J, et al., "An IPV6 Routing Header for Source Routes with the Routing Protocol for Low-Power and Lossy Networks (RPL)," RFC 6554, Mar. 2012, 13 pages.
Agrawal, S., et al., "SRv6 and MPLS interworking," draft-agrawal-spring-srv6-mpls-interworking-00, Oct. 22, 2018, 9 pages, XP015129549.
Li, Z., et al., "Compressed SRv6 Network Programming," draft-li-spring-compressed-srv6-np-00, Jul. 22, 2019, 15 pages, XP015134411.

(Continued)

*Primary Examiner* — Christine T Duong
(74) *Attorney, Agent, or Firm* — Conley Rose, P.C.

(57) ABSTRACT

A segment routing device receives a first packet from a first network. A first packet header of the first packet includes a segment list. The segment list includes a plurality of sequentially arranged identifiers. The identifiers include a first-type identifier and a plurality of second-type identifiers. Network devices or links identified by the first-type identifier and the second-type identifier are respectively on the first network and a second network. A type of the first network is different from a type of the second network. The segment routing device encapsulates a second packet header for the first packet to form a second packet. The second packet header includes the plurality of second-type identifiers. The segment routing device sends the second packet to the second network.

30 Claims, 15 Drawing Sheets

(56) References Cited

OTHER PUBLICATIONS

Weiqiang, C., et al., "Unified Identifier in IPv6 Segment Routing Networks," draft-mirsky-6man-unified-id-sr-04, Nov. 3, 2019, 12 pages, XP015136334.
Teppei Kamata, et al., "Segment Routing Tutorial, JANOG40 Meeting in Fukushima," anog40-sr-kamata-takeda-00.pdf, Jul. 18, 2017, 3 pages.

* cited by examiner

| 0 | | 15 | | 31 |
|---|---|---|---|---|
| Version | Traffic Class | Flow Label | | |
| Payload Length | | Next Header | Hop Limit | |
| Source Address | | | | |
| Destination Address | | | | |
| Next Header | Hdr Ext Len | Routing Type | Segment Left | |
| Last Entry | Flags | Tag | | |
| SID L | | | | |
| SID K | | | | |
| MPLS G | | | | |
| MPLS H | | | | |
| MPLS J | | | | |
| Padding | | | | |
| SID F | | | | |
| SID D | | | | |
| SID C | | | | |
| SID B | | | | |
| Optional TLV objects (variable) | | | | |
| IPv6 Payload | | | | |

FIG. 5

| 0 | | 15 | | 31 |
|---|---|---|---|---|
| Version | Traffic Class | | Flow Label | |
| Payload Length | | | Next Header | Hop Limit |
| Source Address ||||
| Destination Address ||||
| Next Header | Hdr Ext Len | | Routing Type | Segment Left |
| Last Entry | Flags | | Tag ||
| SID L ||||
| SID K ||||
| MPLS H ||||
| MPLS J ||||
| Padding ||||
| C-SID C ||||
| C-SID D ||||
| C-SID F ||||
| MPLS G ||||
| SID B ||||
| Optional TLV objects (variable) ||||
| IPv6 Payload ||||

FIG. 6

| 0 | | 15 | | 31 |
|---|---|---|---|---|
| Version | Traffic Class | Flow Label ||| 
| Payload Length || Next Header | Hop Limit ||
| Source Address |||||
| Destination Address |||||
| Next Header | Hdr Ext Len | Routing Type | Segment Left ||
| Last Entry | Flags || Tag ||
| SID L |||||
| SID K |||||
| Flexible length type specific argument |||||
| IPv4 F |||||
| IPv4 J |||||
| Tunnel Type |||||
| SID F |||||
| SID D |||||
| SID C |||||
| SID B |||||
| Optional TLV objects (variable) |||||
| IPv6 Payload |||||

FIG. 7

METHOD FOR FORWARDING PACKET IN HYBRID NETWORK, DEVICE, AND SYSTEM

CROSS-REFERENCE TO RELATED APPLICATIONS

This claims priority to Chinese Patent App. No. 202010085223.8, filed on Feb. 10, 2020, which is incorporated by reference.

FIELD

This disclosure relates to the communications field, and in particular, to a method for forwarding a packet in a hybrid network, a network device, and a system.

BACKGROUND

Segment Routing (SR) is a protocol designed based on a source routing concept to forward a data packet on a network. SR supports specifying explicitly a forwarding path of the data packet on a source node. When being deployed on an Internet Protocol version 6 (IPv6) data plane, SR is referred to as Segment Routing with IPv6 data plane (SRv6). When being deployed on a Multiprotocol Label Switching (MPLS) data plane, SR is referred to as SR-MPLS.

SRv6 extends a segment routing header (SRH) based on IPv6. The SRH includes a segment list and is used to support programming of an entire forwarding path on an ingress device on the forwarding path. Specifically, the segment list includes a plurality of sequentially arranged segment identifiers (SIDs), and each SID corresponds to one node or link on a packet forwarding path. The SRH including the segment list is encapsulated in a data packet. Therefore, in a packet forwarding process, forwarding processing indicated by each SID in the segment list is sequentially performed, to implement packet forwarding.

However, in an actual network scenario, the packet forwarding path usually needs to pass through a network device that does not support the SRv6, for example, a network device that supports MPLS or a network device that supports Internet Protocol version 4 (IPv4). Therefore, the entire forwarding path cannot be programmed in the segment list. In some approaches, for the foregoing path including a plurality of types of network devices, packet forwarding on the entire path is generally completed in a manner of segment-based path computation and segment-by-segment splicing. Consequently, technical problems that a global optimal path cannot be obtained and a configuration at a splicing node is complex are caused.

SUMMARY

A packet forwarding method, a device, and a system resolve technical problems that a global optimal path cannot be obtained and a configuration at a splicing node is complex.

According to a first aspect, a packet forwarding method includes: A segment routing device receives a first packet from a first network. A first packet header of the first packet includes a segment list. The segment list includes a plurality of sequentially arranged identifiers. Each of the plurality of identifiers is used to identify one network device or one link. The plurality of identifiers includes at least one first-type identifier and a plurality of second-type identifiers. A type of the first-type identifier is different from a type of the second-type identifier. A network device or a link identified by the first-type identifier is on the first network. A network device or a link identified by the second-type identifier is on a second network. A type of the first network is different from a type of the second network. The segment routing device encapsulates a second packet header for the first packet to form a second packet. The second packet header includes the plurality of second-type identifiers. The segment routing device sends the second packet to the second network.

The method may be performed by an intermediate node on a packet forwarding path. In this method, a plurality of types of identifiers are used in the segment list of the packet to identify network devices on a plurality of types of networks. The plurality of types of identifiers are arranged in the segment list in a hybrid manner. On an ingress device of a network that does not support guiding packet forwarding by directly using the segment list, several identifiers corresponding to a segment forwarding path on the network may be obtained from the segment list, and these identifiers are copied to a specific location of the packet. In this way, another network device on the network can forward the packet according to a specific manner of guiding packet forwarding on the network. According to the method, a packet forwarding path that passes through the plurality of types of networks can be programmed in the segment list, and the segment list is encapsulated in the packet, to avoid segment-based path computation and segment-by-segment splicing. This facilitates global optimal path planning and simplifies a network configuration.

In a possible implementation, the at least one first-type identifier includes a segment identifier whose length is 128 bits or a compressed segment identifier whose length is less than 128 bits. The first-type identifier may be an SID or a compressed segment identifier in the segment list, and is used to identify a network device or a link on an SRv6 network.

In a possible implementation, the plurality of second-type identifiers are adjacent to each other, and the first-type identifier is located before the plurality of second-type identifiers, or the first-type identifier is located after the plurality of second-type identifiers.

In a possible implementation, the segment list includes an indication identifier, and the indication identifier is used to indicate a start location of the second-type identifier. When reading the indication identifier, the intermediate node on the packet forwarding path learns the start location of the second-type identifier.

In a possible implementation, the indication identifier is located after the first-type identifier and before the plurality of second-type identifiers. In this case, the indication identifier is an independent identifier between the first-type identifier and the second-type identifiers.

In a possible implementation, a length of the indication identifier is the same as the length of the compressed segment identifier. For example, when the length of the compressed segment identifier is 32 bits, the length of the indication identifier may also be 32 bits.

In a possible implementation, the indication identifier is included in an end segment identifier. The end segment identifier is one of the at least one first-type identifier. The end segment identifier is adjacent to a first identifier in the plurality of second-type identifiers, and the end segment identifier is located before the first identifier. In this case, a network device or a link indicated by the end segment identifier is located at an edge of the SRv6 network.

In a possible implementation, the end segment identifier is a segment identifier whose length is 128 bits or a compressed segment identifier whose length is less than 128 bits.

In a possible implementation, the indication identifier is used to identify a function on the segment routing internet protocol version 6 SRv6 network, and the indication identifier is located in a function field of the end segment identifier. In this case, the indication identifier is located in the function field of the segment identifier, and is used to indicate a function on the SRv6 network.

In a possible implementation, the plurality of second-type identifiers are adjacent to each other. The plurality of second-type identifiers include a multi-protocol label switch MPLS label. The second packet header is an MPLS packet header. The second network is an MPLS network.

In a possible implementation, the first packet further includes an end identifier. That the segment routing device encapsulates a second packet header for the first packet further includes: The segment routing device determines a last identifier in the plurality of second-type identifiers based on the end identifier. For example, when the intermediate node on the packet forwarding path sequentially reads the plurality of second-type identifiers in the segment list, if the end identifier is read, the intermediate node learns that the plurality of second-type identifiers have ended.

In a possible implementation, the end identifier is included in the segment list, and the end identifier is located after the plurality of second-type identifiers. In this case, the end identifier is an independent identifier after the plurality of second-type identifiers.

In a possible implementation, the end identifier is included in the segment list, and the end identifier is located in the last identifier in the plurality of second-type identifiers.

In a possible implementation, the first packet further includes a quantity identifier. That the segment routing device encapsulates a second packet header for the first packet further includes: The segment routing device determines a quantity of the plurality of second-type identifiers based on the quantity identifier. For example, the intermediate node on the packet forwarding path sequentially reads the plurality of second-type identifiers in the segment list based on the quantity, and stops after an identifier of the quantity is read.

In a possible implementation, the quantity identifier is included in the end segment identifier. The end segment identifier is one of the at least one first-type identifier. The end segment identifier is adjacent to the first identifier in the plurality of second-type identifiers, and the end segment identifier is located before the first identifier.

In a possible implementation, the quantity identifier is included in the first identifier in the plurality of second-type identifiers.

In a possible implementation, the plurality of second-type identifiers include an internet protocol version 4 IPv4 address. The second packet header is an IPv4 packet header. The second network is an IPv4 network.

In a possible implementation, the plurality of second-type identifiers include a source identifier and a destination identifier. The source identifier corresponds to a source address of the IPv4 tunnel. The destination identifier corresponds to a destination address of the IPv4 tunnel. When the second-type identifier is the IPv4 address, the segment list includes at least the source address and the destination address of the IPv4 tunnel.

In a possible implementation, the segment list includes a type identifier, and the type identifier is used to indicate an IPv4 tunnel type. The IPv4 tunnel is used to forward the second packet.

In a possible implementation, the first packet header is a segment routing header SRH.

In a possible implementation, the first packet further includes a pointer. That the segment routing device encapsulates a second packet header for the first packet includes: The segment routing device determines a location of the first identifier in the plurality of second-type identifiers in the segment list based on the pointer.

In a possible implementation, the segment list includes an element whose length is 128 bits, and the first identifier in the plurality of second-type identifiers is a first identifier in the element. For example, in the segment list, after the at least one first-type identifier, the plurality of second-type identifiers start to be arranged in a new element in the segment list, and are not arranged in a same element as the previous first-type identifier.

In a possible implementation, the second packet includes an IPv6 packet header. The method further includes: adding a cross-domain identifier to a destination address field of the IPv6 packet header, where the cross-domain identifier is one of the at least one first-type identifier, and the cross-domain identifier is a segment identifier whose length is 128 bits or a compressed segment identifier whose length is less than 128 bits. When the packet further enters the first network for forwarding after passing through the second network, the intermediate node on the packet forwarding path not only adds the second packet header to guide forwarding of the packet on the second network, but also adds an SID of a node on the first network that is after the second network to a DA field in the packet to guide continuous forwarding of the packet to the first network after the packet passes through the second network.

According to a second aspect, a packet forwarding method includes: A segment routing device receives a first packet. The segment routing device adds a segment list to the first packet to form a second packet. The segment list indicates a forwarding path of the second packet. The forwarding path includes a plurality of network devices. The segment list includes a plurality of sequentially arranged identifiers. Each of the plurality of identifiers is used to identify one of the plurality of network devices or one link on the forwarding path. The plurality of identifiers include at least one first-type identifier and a plurality of second-type identifiers. A type of the first-type identifier is different from a type of the second-type identifier. A network device or a link identified by the first-type identifier is on a first network. A network device or a link identified by the second-type identifier is on a second network. A type of the first network is different from a type of the second network. The segment routing device sends the second packet.

The method may be performed by an ingress device on a packet forwarding path. In this method, a plurality of types of identifiers are used in the segment list of the packet to identify network devices on a plurality of types of networks. The plurality of types of identifiers are arranged in the segment list in a hybrid manner. On an ingress device of a network that does not support guiding packet forwarding by directly using the segment list, several identifiers corresponding to a segment forwarding path on the network may be obtained from the segment list, and these identifiers are copied to a specific location of the packet. In this way, another network device on the network can forward the packet according to a specific manner of guiding packet forwarding on the network. According to the method, a packet forwarding path that passes through the plurality of types of networks can be programmed in the segment list, and the segment list is encapsulated in the packet on the ingress device of the packet forwarding path, to avoid segment-based path computation and segment-by-segment splicing. This facilitates global optimal path planning and simplifies a network configuration.

In a possible implementation, the method further includes: The segment routing device receives a control packet from a controller, where the control packet includes the segment list.

In a possible implementation, the control packet includes a hybrid flag. The hybrid flag is used to indicate that the plurality of identifiers include the at least one first-type identifier and the plurality of second-type identifiers, and the type of the first-type identifier is different from the type of the second-type identifier.

In a possible implementation, before the segment routing device adds the segment list to the first packet to form the second packet, the method further includes: The segment routing device determines the forwarding path, and the segment routing device generates a segment list corresponding to the forwarding path.

According to a third aspect, a segment list generation method includes: A controller determines a forwarding path of a packet. The forwarding path includes a plurality of network devices located on at least two networks. The at least two networks include a first network and a second network. A type of the first network is different from a type of the second network. The controller generates the segment list corresponding to the forwarding path. The segment list includes the plurality of sequentially arranged identifiers. Each of the plurality of identifiers corresponds to one of the plurality of network devices or one link on the forwarding path. The plurality of identifiers include at least one first-type identifier and a plurality of second-type identifiers. A type of the first-type identifier is different from a type of the second-type identifier. A network device or a link identified by the first-type identifier is on the first network. A network device or a link identified by the second-type identifier is on the second network. The controller sends the segment list to an ingress device on the forwarding path.

The method may be performed by a controller on a network. On an actual network, a forwarding path of a packet may be generated by a controller, or may be generated by an ingress node on the forwarding path. When the controller generates the forwarding path of the packet, the controller also generates a segment list indicating the forwarding path. The segment list may be a segment list including the first-type identifier and the second-type identifier, namely, a hybrid segment list or a generic segment list. The controller sends the segment list to the ingress node on the forwarding path. After receiving a packet, the ingress node on the forwarding path determines a forwarding path of the packet from several forwarding paths stored in the device, and determines a segment list corresponding to the forwarding path. The segment list is added to the packet, to guide forwarding of the packet.

According to a fourth aspect, a network device performs the method in any one of the first aspect or the possible implementations of the first aspect. Specifically, the network device includes units configured to perform the method in any one of the first aspect or the possible implementations of the first aspect.

According to a fifth aspect, a network device performs the method in any one of the second aspect or the possible implementations of the second aspect. Specifically, the network device includes units configured to perform the method in any one of the second aspect or the possible implementations of the second aspect.

According to a sixth aspect, a controller performs the method in the third aspect. Specifically, the network device includes units configured to perform the method in the third aspect.

According to a seventh aspect, a network device includes a processor, a communications interface, and a memory. The communications interface may be a transceiver. The memory may be configured to store program code. The processor is configured to invoke the program code in the memory to perform the method in any one of the first aspect or the possible implementations of the first aspect. Details are not described herein again.

According to an eighth aspect, a network device includes a processor, a communications interface, and a memory. The communications interface may be a transceiver. The memory may be configured to store program code. The processor is configured to invoke the program code in the memory to perform the method in any one of the second aspect or the possible implementations of the second aspect. Details are not described herein again.

According to a ninth aspect, a controller includes a processor, a communications interface, and a memory. The communications interface may be a transceiver. The memory may be configured to store program code. The processor is configured to invoke the program code in the memory to perform the method in the third aspect. Details are not described herein again.

According to a tenth aspect, a network system includes the network device provided in the fourth aspect or the fifth aspect. Alternatively, the network system includes the network device provided in the seventh aspect or the eighth aspect.

According to an eleventh aspect, a network system includes the network device provided in the fourth aspect or the fifth aspect and the controller provided in the sixth aspect. Alternatively, the network system includes the network device provided in the seventh aspect or the eighth aspect and the controller provided in the ninth aspect.

According to a twelfth aspect, a computer-readable storage medium stores an instruction. When the instruction is run on a computer, the computer is enabled to perform the methods in the foregoing aspects.

According to a thirteenth aspect, a computer program product includes a computer program instruction. When the computer program product runs on a network device, the network device is enabled to perform the method provided in the first aspect, the second aspect, the third aspect, any one of the possible implementations of the first aspect, or any one of the possible implementations of the second aspect.

According to a fourteenth aspect, a chip includes a memory and a processor. The memory is configured to store a computer program. The processor is configured to invoke the computer program from the memory and run the computer program, to perform the method in any one of the first aspect and the possible implementations of the first aspect, or the processor performs the method in any one of the second aspect or the possible implementations of the second aspect, or the processor performs the method in the third aspect.

Optionally, the chip includes only the processor, and the processor is configured to read and execute the computer program stored in the memory. When the computer program is executed, the processor performs the method in any one of the first aspect or the possible implementations of the first aspect, or the processor performs the method in any one of the second aspect or the possible implementations of the second aspect, or the processor performs the method in the third aspect.

According to a fifteenth aspect, a network node includes a main control board and an interface board. The main control board includes a first processor and a first memory. The interface board includes a second processor, a second memory, and an interface card. The main control board and the interface board are coupled.

The first memory may be configured to store program code. The first processor is configured to invoke the program code in the first memory to perform the following operation: encapsulating a second packet header for a first packet to form a second packet, where the second packet header includes a plurality of second-type identifiers.

The second memory may be configured to store program code. The second processor is configured to invoke the program code in the second memory, to trigger the interface card to perform the following operations: receiving a first packet from a first network, where a first packet header of the first packet includes a segment list, the segment list includes a plurality of sequentially arranged identifiers, each of the plurality of identifiers is used to identify one network device or one link, the plurality of identifiers include at least one first-type identifier and a plurality of second-type identifiers, a type of the first-type identifier is different from a type of the second-type identifier, a network device or a link identified by the first-type identifier is on the first network, a network device or a link identified by the second-type identifier is on a second network, and a type of the first network is different from a type of the second network; and sending the second packet to the second network.

In a possible implementation, an inter-process communication (IPC) channel is established between the main control board and the interface board, and the main control board and the interface board communicate with each other through the IPC channel.

According to a sixteenth aspect, a network node is provided. The network node includes a main control board and an interface board. The main control board includes a first processor and a first memory. The interface board includes a second processor, a second memory, and an interface card. The main control board and the interface board are coupled. The first memory may be configured to store program code. The first processor is configured to invoke the program code in the first memory to perform the following operation: adding a segment list to a first packet to form a second packet. The segment list indicates a forwarding path of the second packet. The forwarding path includes a plurality of network devices. The segment list includes a plurality of sequentially arranged identifiers. Each of the plurality of identifiers is used to identify one of the plurality of network devices or one link on the forwarding path. The plurality of identifiers include at least one first-type identifier and a plurality of second-type identifiers. A type of the first-type identifier is different from a type of the second-type identifier. A network device or a link identified by the first-type identifier is on a first network. A network device or a link identified by the second-type identifier is on a second network. A type of the first network is different from a type of the second network.

The second memory may be configured to store program code. The second processor is configured to invoke the program code in the second memory, to trigger the interface card to perform the following operations: receiving a first packet and sending the second packet.

In a possible implementation, an IPC channel is established between the main control board and the interface board, and the main control board and the interface board communicate with each other through the IPC channel.

BRIEF DESCRIPTION OF THE DRAWINGS

To describe the technical solutions more clearly, the following briefly describes the accompanying drawings for describing the embodiments. The accompanying drawings in the following description merely show some embodiments, and persons of ordinary skill in the art can derive other technical solutions and accompanying drawings from these accompanying drawings without creative efforts.

FIG. 5 is a schematic diagram of a structure of a packet according to an embodiment;

FIG. 6 is a schematic diagram of a structure of a packet according to an embodiment;

FIG. 7 is a schematic diagram of a structure of a packet according to an embodiment;

DETAILED DESCRIPTION

The following describes the embodiments with reference to accompanying drawings.

Figure 1:
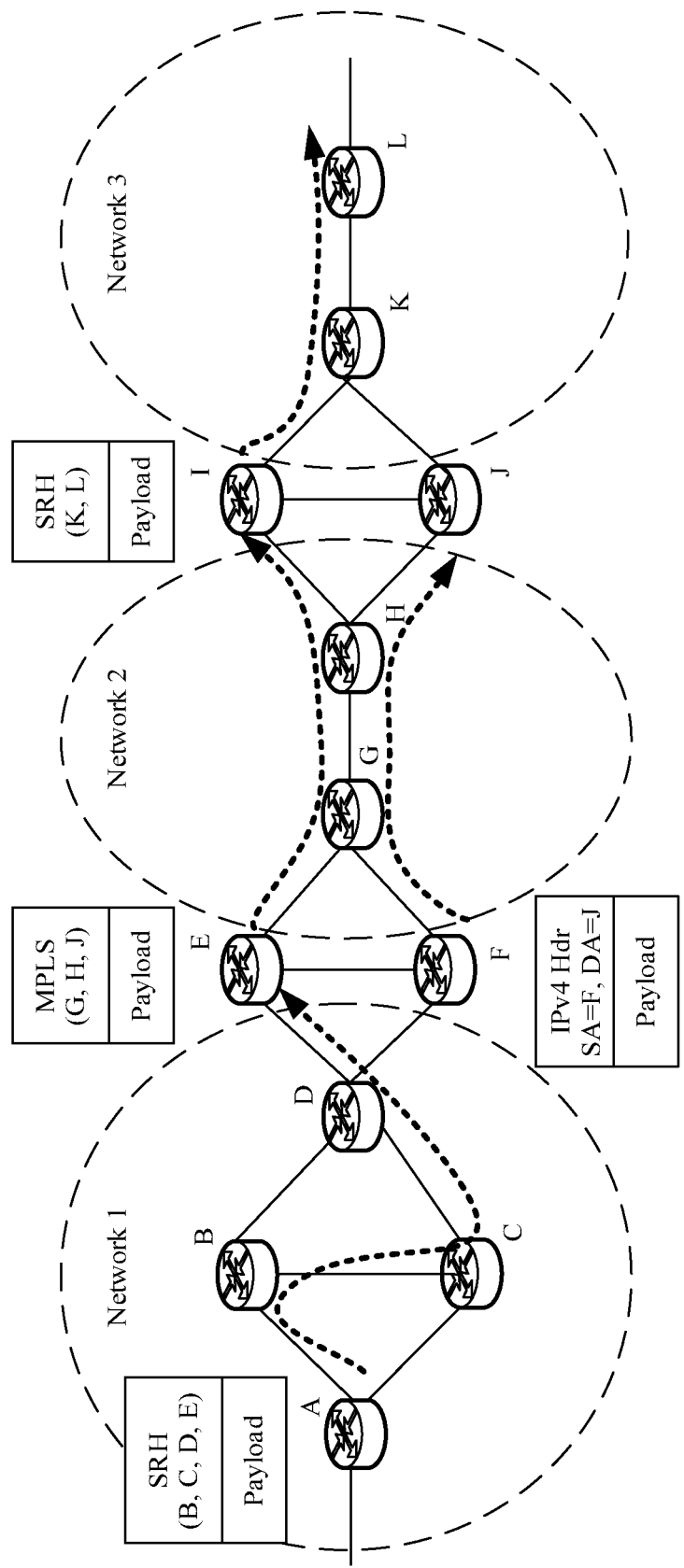
FIG. 1 is a schematic diagram of a scenario according to an embodiment.

FIG. 1 is a possible scenario according to an embodiment. The scenario includes different types of networks, specifically including a network 1, a network 2, and a network 3. Each network includes a plurality of network devices, and these network devices each may be a switch, a router, or a forwarder. The network device in this embodiment may also be referred to as a network node or a node. Specifically, the network 1 includes a node A, a node B, a node C, and a node D. The network 2 includes a node G and a node H. A node E and a node F are devices between the network 1 and the network 2. The node E and the node F support both the network 1 and the network 2. The network 3 includes a node K and a node L. A node I and a node J are devices between the network 2 and the network 3. The node I and the node J support both the network 2 and the network 3.

The network may further include a controller, which is not shown in FIG. 1. The controller may be connected to the nodes A to L. The controller may send a control packet that includes network configuration information to the nodes A to L. The controller may further calculate a forwarding path of the packet on each network, generate a segment list corresponding to the forwarding path, and send the segment list to an ingress device of each network. Specifically, an ingress device of the network 1 is the node A; an ingress device of the network 2 is the node E or the node F; and an ingress device of the network 3 is the node I or the node J. The ingress device of each network may also calculate the forwarding path of the packet on the network, and generate the segment list corresponding to the forwarding path. The ingress device of each network may further encapsulate the obtained segment list in the packet, to guide packet forwarding.

Optionally, a type of the network 1 is the same as a type of the network 3, and a type of the network 2 is different from the type of the network 1 and the network 3. For example, the network 1 and the network 3 each are an SRv6 network, and the network 2 is an MPLS network or an IPv4 network. To be specific, the node A, the node B, the node C, and the node D each may be a network device supporting SRv6. The node G and the node H each are a network device supporting MPLS or IPv4. The node K and the node L each may be a network device supporting the SRv6. The Node E, the node F, the node I, and the node J each are a network device supporting both the SRv6 and the MPLS or the IPv4. A network device supporting the SRv6 may also be referred to as a segment routing device. In other words, the node A, the node B, the node C, the node D, the node E, the node F, the node I, and the node J each may also be referred to as a segment routing device.

Figure 2:
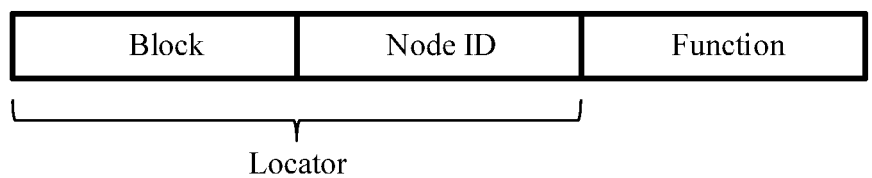
FIG. 2 is a schematic diagram of a format of an SID according to an embodiment.

On an SR network, a packet processing process includes a plurality of segments, and each segment is an instruction or an instruction set for processing a packet. On the SRv6 network, each segment has a corresponding segment identifier, namely an SID. The segment identifier includes two types: a node SID and an adjacent SID. FIG. 2 shows a format of the SID on the SRv6 network. As shown in FIG. 2, each SID may include a locator field and a function field.

The locator field in the SID is used to locate a specific network device that executes an instruction or an instruction set included in a segment. The locator field includes a block part and a node ID part. In an SRv6 network domain, block parts of SIDs of network devices may be the same. In an SRv6 network domain, a node ID part of an SID of each network device is different, and each node ID part is used to uniquely determine a network device in the domain. For a specific SID, a network device uniquely determined by a node ID part of the SID is a network device that executes a segment identified by the SID.

The function field in the SID is used to indicate specific content of the instruction or the instruction set included in the segment. In other words, the function field is used to indicate a function on the SRv6 network. The function on the SRv6 network may further involve an argument, and the argument is indicated by an argument field in the SID (not shown in FIG. 2). When the function does not involve the argument, the SID may not include the argument field.

Generally, a total length of the SID on the SRv6 network is 128 bits. The locator field and the function field are separately of specific lengths, and these specific lengths may be changed through network setting. For example, the locator field is 48 bits, and the function field is 80 bits. Alternatively, the locator field is 64 bits, and the function field is 64 bits. Alternatively, the locator field is 48 bits, the function field is 64 bits, and the argument field is 16 bits.

Figure 3:
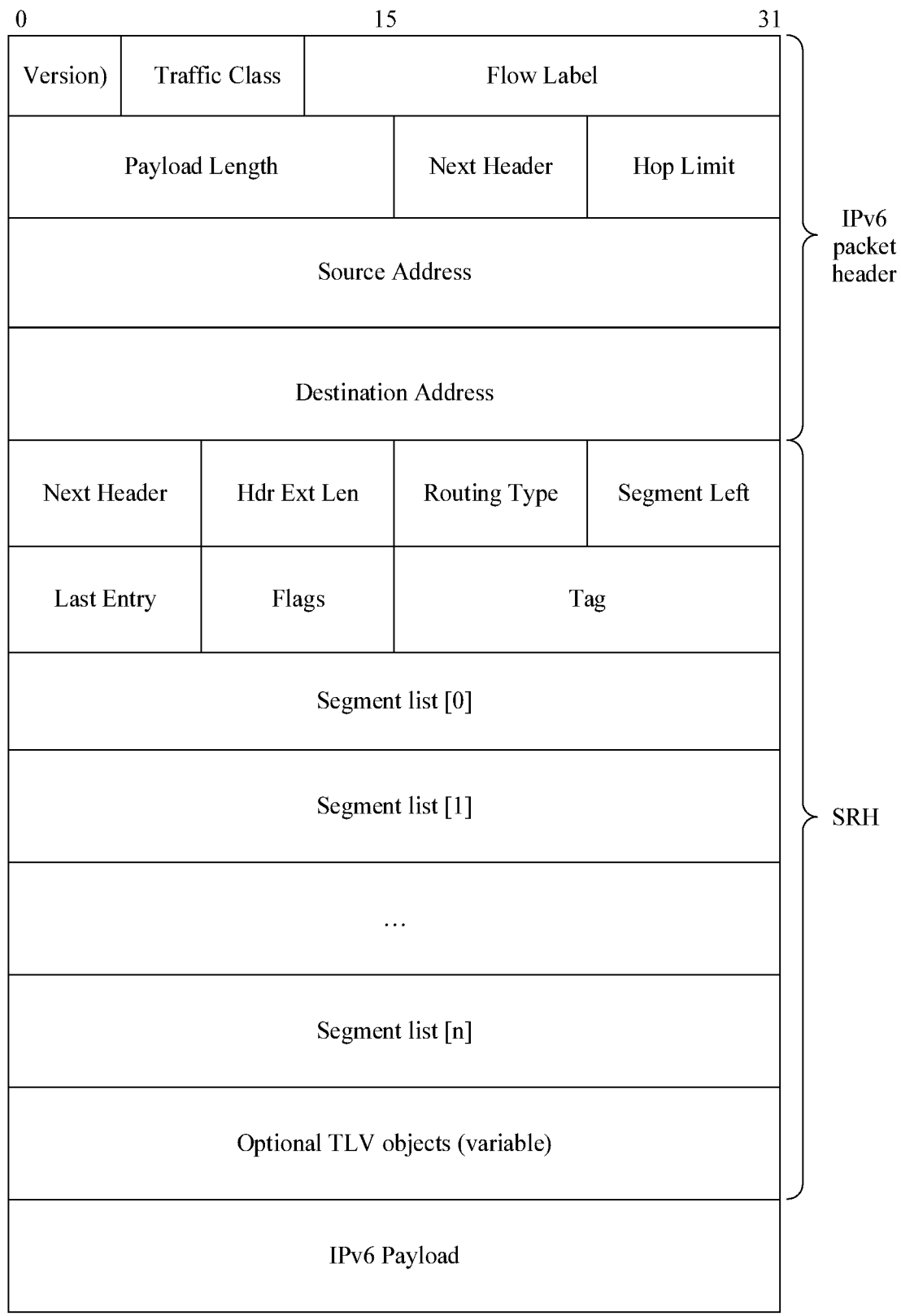
FIG. 3 is a schematic diagram of a structure of a packet according to an embodiment.

A segment list includes a plurality of SIDs. FIG. 3 shows a format of a packet on the SRv6 network. As shown in FIG. 3, a packet header of the packet includes an IPv6 packet header and an SRH. The IPv6 packet header includes a destination address (DA) field. The SRH includes a segment list, and the segment list includes a plurality of sequentially arranged SIDs. These SIDs may be node segment identifiers, adjacent segment identifiers, or a combination of a node segment identifier and an adjacent segment identifier.

The segment list may be encapsulated in the packet by an ingress node on a forwarding path of the packet on the SRv6 network. A subsequent node on the forwarding path of the packet may process the packet based on the segment list in the packet. With reference to the scenario shown in FIG. 1, when the packet needs to be forwarded on the network 1, the forwarding path of the packet may sequentially pass through the node A, the node B, the node C, and the node D, and reach the node E. The segment list corresponding to the forwarding path is encapsulated in the packet by the node A, and the node B, the node C, the node D, and the node E process the packet based on the segment list in the packet. Specifically, the packet is sent by the ingress node on the forwarding path, and is received by a specific node on the forwarding path. If the node determines that the DA field in the IPv6 packet header of the packet includes an SID of the node, the node processes the packet according to an instruction set corresponding to a segment identified by the SID. A specific manner of processing the packet may be, for example, forwarding the packet. The network device further needs to update the DA field. In a process of updating the DA field, a segment left (SL) pointer in the SRH needs to be used. As shown in FIG. 3, the segment list includes the plurality of sequentially arranged SIDs: Segment List [0] to Segment List [n]. The plurality of SIDs separately correspond to a plurality of network devices on the forwarding path of the packet, and the plurality of network devices separately execute instruction sets corresponding to a plurality of segments. The SL pointer may sequentially point to the plurality of SIDs in the segment list. Specifically, in a packet processing process, a value of the SL pointer is updated once a segment is executed. After each update, a location pointed by the SL pointer in the segment list is offset by a length of one SID, that is, 128 bits. As a plurality of segments indicated by the plurality of SIDs in the segment list are sequentially executed, the value of the SL pointer is updated continuously. Therefore, the SL pointer is used to indicate a quantity of remaining to-be-processed segments in the segment list. In other words, each value of the SL pointer corresponds to a specific quantity of remaining to-be-processed segments in the segment list, and the SL pointer always points to a currently to-be-processed SID. In addition, according to a sequence of the segments, indicated by the plurality of SIDs, in the packet processing process, the plurality of SIDs are arranged in descending order in the segment list. To be specific, an SID of a segment that is first executed is arranged at a bottom of the segment list, an SID of a segment that is subsequently executed is sequentially arranged upward, and an SID of a segment that is last executed is arranged at a top of the segment list. In FIG. 3, the Segment List [n] indicates the segment that is first executed, and the Segment List [0] indicates the segment that is last executed. For example, the value of the SL pointer being 3 indicates that the quantity of remaining to-be-processed segments in the segment list is 4. Alternatively, it may also be understood as that the currently to-be-processed SID pointed by the SL pointer is a fourth SID counted from bottom to top. The value of the SL pointer being 0 indicates that the quantity of remaining to-be-processed segments is 1. Alternatively, it may also be understood as that the currently to-be-processed SID pointed by the SL pointer is the last SID counted from bottom to top, namely, the Segment List [0] in FIG. 3. After determining the currently to-be-processed SID based on the SL pointer, the network device copies the SID to the DA field in the IPv6 packet header, to subsequently process the packet based on content in the DA field. The specific manner of processing the packet may be, for example, forwarding the packet.

On an MPLS network, data is classified into forwarding equivalence classes (FECs) according to a processing manner in a forwarding process. For a data flow of an FEC, nodes on a forwarding path are assigned different MPLS labels, and each MPLS label is used to indicate a forwarding processing manner on the node. An ingress device on the MPLS network sequentially encapsulates MPLS labels of subsequent network devices on a corresponding forwarding path in a data packet in a sequence of network devices on the forwarding path. The nodes on the forwarding path sequentially forward the data packet in the sequence of the MPLS labels. With reference to the scenario shown in FIG. 1, the network 2 may be the MPLS network. When the packet needs to be forwarded on the network 2, a forwarding path of the packet may sequentially pass through the node E, the node G, and the node H, and reach the node I. To be specific, nodes on the forwarding path of the packet on the MPLS network include the node E, the node G, the node H, and the node I. The node E sequentially encapsulates MPLS labels corresponding to the node G, the node H, and the node I in the data packet in a sequence of the nodes on the forwarding path, to guide packet forwarding.

On an IPv4 network, the packet may be forwarded through a tunnel. A source node of the tunnel maps the packet into the tunnel based on information included in the packet, to forward the packet. With reference to the scenario shown in FIG. 1, the network 2 may be the IPv4 network. There is a tunnel between the node F and the node J, and the tunnel sequentially passes through the node G and the node H. A type of the tunnel may be an IPv6 over IPv4 (6 over 4) tunnel, a Virtual eXtensible Local Area Network (VXLAN) tunnel, a generic routing encapsulation (GRE) tunnel, or the like. When the packet needs to be forwarded on the network 2, the packet is mapped into the tunnel at the node F based on the information included in the packet, and is forwarded to the node J after passing through the node G and the node H.

It can be learned that manners for guiding packet forwarding are different on different types of networks. However, in some scenarios, an SRv6 packet needs to traverse another type of network for forwarding. For example, in a software-defined wide area network (SD-WAN) scenario, the SRv6 packet need to traverse the IPv4 network for forwarding. On a non-SRv6 network, such as the MPLS network or the IPv4 network, a segment list in an SRH cannot be used to guide packet forwarding on the network. Therefore, segment-based path computation and segment-by-segment splicing may be required to forward the packet on an entire path. For example, in the scenario shown in FIG. 1, the network 1 and the network 3 each are the SRv6 network, the network 2 is the MPLS network, and the packet needs to be forwarded from the node A to the node L. The node A obtains a segment list 1 corresponding to a forwarding path of the packet on the network 1. The segment list 1 may include SIDs of the node B, the node C, the node D, and the node E. With reference to the foregoing description, the node A encapsulates the segment list 1 in the packet, and each node on the forwarding path forwards the packet based on the segment list 1. In this way, the packet reaches the node E. At the node E, the packet leaves the SRv6 network and enters the MPLS network. The node E obtains a plurality of MPLS labels corresponding to a forwarding path of the packet on the network 2. The MPLS labels specifically include MPLS labels corresponding to the node G, the node H, and the node I. The node E sequentially encapsulates these MPLS labels in the data packet in a sequence of the nodes on the forwarding path. Each node on the forwarding path forwards the packet based on the MPLS labels. In this way, the packet reaches the node I. Similar to that on the network 1, the node I obtains a segment list 2 corresponding to a forwarding path of the packet on the network 3. The segment list 2 may include SIDs of the node K and the node L. The node I encapsulates the segment list 2 in the packet, and each node on the forwarding path forwards the packet based on the segment list 2. In this way, the packet reaches the node L. In the foregoing segment-based path computation and segment-by-segment splicing manner, an ingress device of each network needs to obtain a forwarding path of the packet on the network, and splices two adjacent forwarding paths through a node between the network and an adjacent network, to gradually form a complete packet forwarding path. However, because forwarding paths are calculated separately and are not planned globally, a finally obtained complete forwarding path may not be a global optimal forwarding path, and service level agreements (SLA) of the forwarding paths are difficult to be unified. In addition, to implement path splicing at nodes between adjacent networks, additional configuration needs to be performed on these nodes. This increases a workload.

An embodiment provides a packet forwarding method, and a device and a system that are based on the method. The method, the device, and the system are based on a same concept. The method is applied to each node on a packet forwarding path. In this method, an ingress device on the packet forwarding path uses a plurality of types of identifiers to identify network devices on a plurality of types of networks, and arranges the plurality of types of identifiers in a segment list in a hybrid manner. On an ingress device of a network that does not support guiding packet forwarding by directly using the segment list, several identifiers corresponding to a segment forwarding path on the network may be obtained from the segment list, and these identifiers are copied to a specific location of a packet. In this way, another network device on the network can forward the packet according to a specific manner of guiding packet forwarding on the network. According to the method, a packet forwarding path that passes through the plurality of types of networks can be programmed in the segment list, and the segment list is encapsulated in the packet on a first node on the packet forwarding path, to avoid segment-based path computation and segment-by-segment splicing. This facilitates global optimal path planning and simplifies a network configuration.

Figure 4:
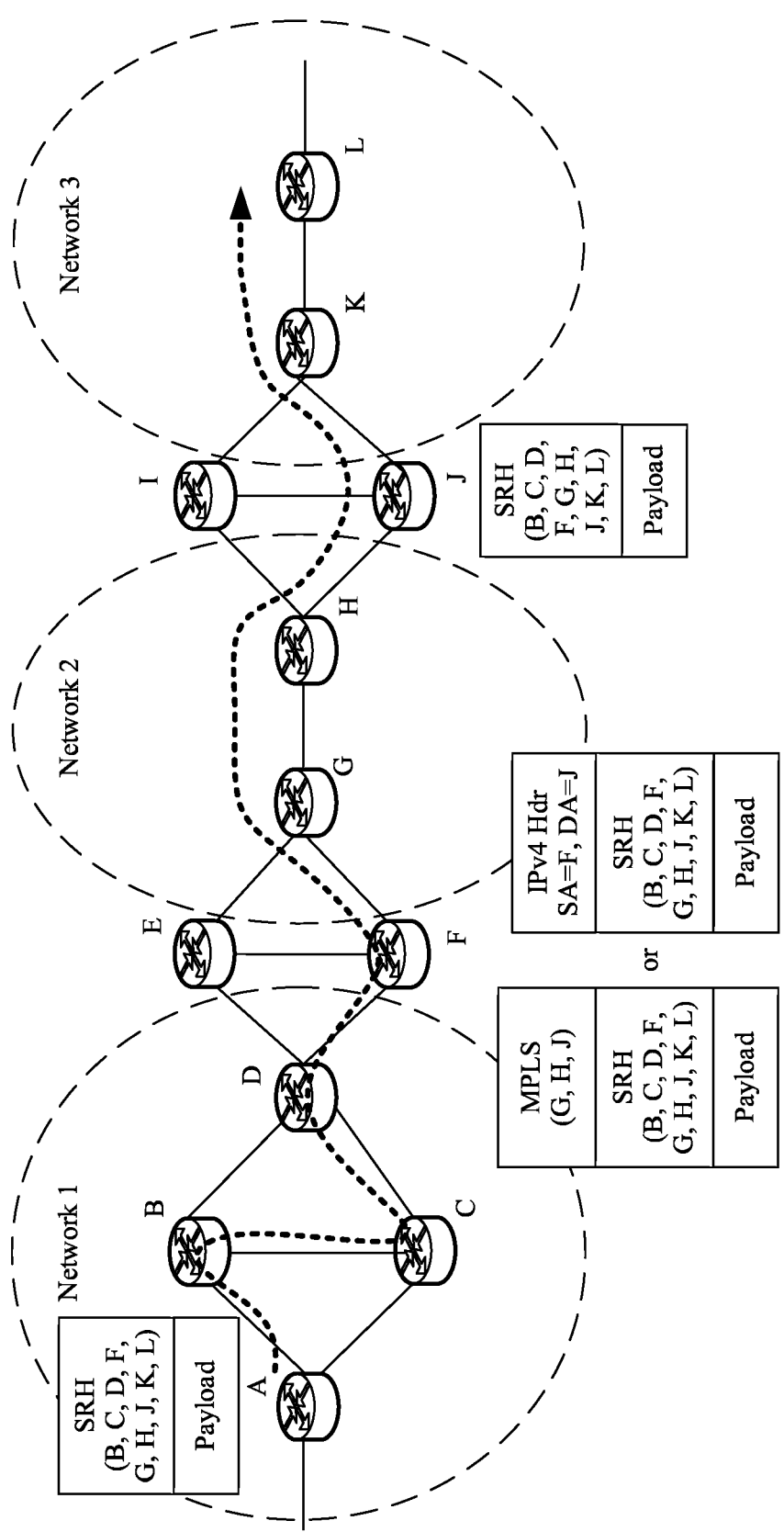
FIG. 4 is a schematic diagram of a scenario according to an embodiment.

With reference to a scenario shown in FIG. 4, a network 1 and a network 3 each are an SRv6 network, and a network 2 is an MPLS network, or the network 2 is an IPv4 network.

Figure 11:
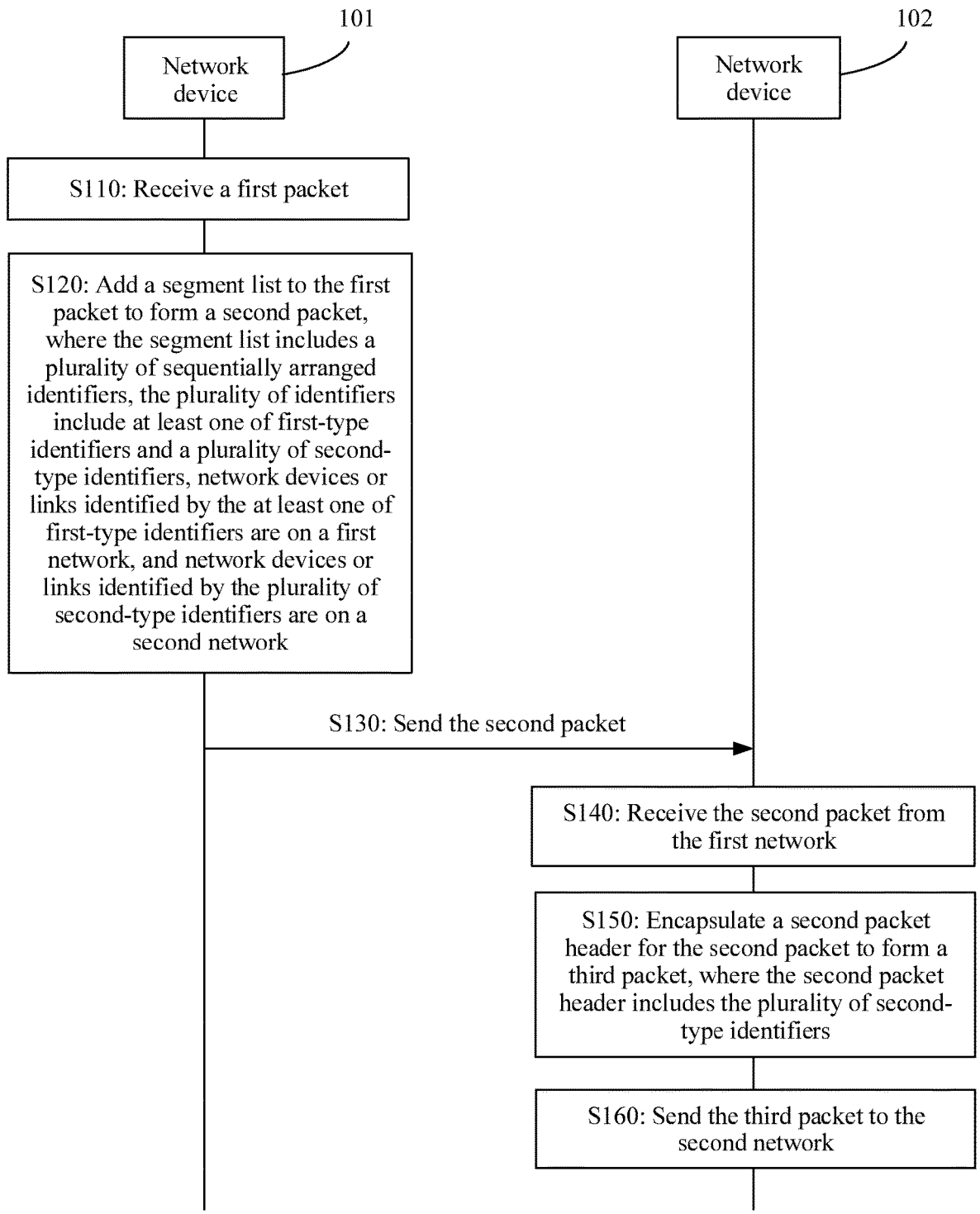
FIG. 11 is a flowchart of a packet processing method according to an embodiment.

A node A, a node B, a node C, and a node D each are a network device supporting SRv6. A node G and a node H each are a network device supporting MPLS or IPv4. A node K and a node L each are a network device supporting the SRv6. A node E, a node F, a node I, and a node J each are a network device supporting both the SRv6 and the MPLS, or the node E, the node F, the node I, and the node J each are a network device supporting both the SRv6 and the IPv4. The network may further include a controller, which is not shown in FIG. 4. The node A sends the packet to the node L. FIG. 11 is a flowchart of the method. The method is applied to a network device 101 and a network device 102. The network device 101 may be the ingress device on the packet forwarding path, and is configured to add, to the packet, a segment list indicating the packet forwarding path. For example, the network device 101 is the node A shown in FIG. 4. The network device 102 may be a node on the forwarding path, for example, the node F shown in FIG. 4. The method includes the following steps.

S110: The network device 101 receives a first packet.

The network device 101 may be the node A in FIG. 4. With reference to the scenario shown in FIG. 4, the node A receives a packet, and the packet may be referred to as the first packet. The node A is the ingress device on the packet forwarding path, and the node A is also an ingress device on the SRv6 network. The packet needs to be sent to the node J. The node A obtains a forwarding path of the packet. The forwarding path includes a plurality of network devices. As shown in FIG. 4, the forwarding path passes through the node B, the node C, the node D, the node F, the node G, the node H, the node J, and the node K, and reaches the node L. It can be learned that the forwarding path includes a plurality of network devices located on the network 1, the network 2, and the network 3, and a type of the network 1 and the network 3 is different from a type of the network 2.

Optionally, the packet forwarding path is generated by a controller, and the segment list is generated by the controller. The controller sends the generated segment list to the node A. Specifically, the controller sends a control packet to the node A, and the control packet includes the segment list.

Optionally, the packet forwarding path is generated by the node A, and the segment list is generated by the node A. The node A determines the packet forwarding path, and generates the segment list corresponding to the forwarding path.

S120: The network device 101 adds a segment list to the first packet to form a second packet, where the segment list indicates a forwarding path of the second packet, the forwarding path includes a plurality of network devices, the segment list includes a plurality of sequentially arranged identifiers, each of the plurality of identifiers is used to identify one of the plurality of network devices or one link on the forwarding path, the plurality of identifiers include at least one first-type identifier and a plurality of second-type identifiers, a type of the first-type identifier is different from a type of the second-type identifier, a network device or a link identified by the first-type identifier is on a first network, a network device or a link identified by the second-type identifier is on a second network, and a type of the first network is different from a type of the second network.

The network device 101 may be the node A in FIG. 4. With reference to the scenario shown in FIG. 4, the node A adds, to the packet, the segment list indicating the packet forwarding path. The packet to which the segment list is added may be referred to as the second packet. The segment list includes the plurality of sequentially arranged identifiers. Each of the plurality of identifiers may be used to identify one of the plurality of network devices on the forwarding path, or may be used to identify one link on the forwarding path. Specifically, the node A adds an SRH to the packet, and the SRH includes the segment list.

In this embodiment, the plurality of identifiers in the segment list may include at least two types of identifiers: the first-type identifier and the second-type identifier. The first-type identifier is used to identify a segment identifier or a compressed segment identifier of a forwarding path of the packet on the SRv6 network, and the second-type identifier is used to identify a forwarding path of the packet on a non-SRv6 network. In this case, the segment list may also be referred to as a hybrid segment list or a generic segment list. An SRH including the generic segment list may be referred to as a generic segment routing header (G-SRH). Specifically, the plurality of identifiers in the segment list include the at least one first-type identifier and the plurality of second-type identifiers. The type of the first-type identifier is different from the type of the second-type identifier. The network device or the link identified by the first-type identifier is on the first network. Network devices or links identified by the plurality of second-type identifiers are on the second network. The type of the first network is different from the type of the second network. Optionally, the plurality of second-type identifiers are adjacent to each other. Optionally, there may be a plurality of first-type identifiers.

With reference to the scenario shown in FIG. 4, the first network may be the SRv6 network. The first network may include the network 1 and the network 3. The network device or the link identified by the first-type identifier is on the network 1 and the network 3. The first-type identifier is a segment identifier whose length is 128 bits or a compressed segment identifier whose length is less than 128 bits. The second network may be an MPLS network or an IPv4 network. The second network may be the network 2. The network devices or the links identified by the plurality of second-type identifiers are on the network 2. The second-type of identifier includes an MPLS label or an IPv4 address.

An introduction to the compressed segment identifier whose length is less than 128 bits may be found in a draft-li-spring-compressed-srv6-np-00 entitled "Compressed SRv6 Network Programming" and dated July 2019, and in a patent document No. 201910925974.3 filed on Sep. 27, 2019, which are incorporated herein by reference in their entireties as if they were all stated.

For example, the length of the compressed segment identifier is 32 bits, which is the same as a length of the MPLS label or a length of the IPv4 address.

When the network 2 is the MPLS network, the packet including the segment list may be shown in FIG. 5. The segment list is included in the SRH. The segment list includes two types of identifiers. The first-type identifier is a plurality of SIDs, and specifically includes SIDs of the node B, the node C, the node D, the node F, the node K, and the node L. These SIDs are respectively represented as an SID B, an SID C, an SID D, an SID F, an SID K, and an SID L. The second-type identifier is a plurality of adjacent MPLS labels, and specifically includes MPLS labels of the node G, the node H, and the node J. These MPLS labels are respectively represented as an MPLS G, an MPLS H, and an MPLS J.

A forwarding path on the SRv6 network is indicated by SIDs, such as the SID B, the SID C, the SID D, the SID K and the SID L. A forwarding path on the MPLS network is indicated by MPLS labels, such as the MPLS G and the MPLS H. A forwarding path between the SRv6 network and the MPLS network may be indicated by an SID or an MPLS label, for example, the SID F and the MPLS J.

Identifiers corresponding to all nodes are sequentially arranged in an arrangement sequence of these nodes on the forwarding path. With reference to the foregoing description, the SIDs are arranged in descending order in the segment list. Therefore, the identifiers corresponding to all the nodes are also arranged in descending order in the segment list. Specifically, that the SID B is arranged at a bottom of the segment list may also be referred to as that the SID B is arranged in the foremost of the segment list. That the SID C, the SID D, and the SID F are sequentially arranged upwards may be referred to as that the SID C, the SID D, and the SID F are sequentially arranged backwards. The plurality of MPLS labels are arranged as an entirety after the SID F, and then the SID K and the SID L are sequentially arranged after the plurality of MPLS labels. The plurality of MPLS labels may be arranged in ascending order in the arrangement sequence of the nodes on the forwarding path, as shown in FIG. 5. However, the plurality of MPLS labels may alternatively be arranged in descending order in the arrangement sequence of the nodes on the forwarding path.

Optionally, when a quantity of the plurality of MPLS labels is relatively large, the plurality of MPLS labels may be arranged in a plurality of elements in the segment list. A length of each element is 128 bits. In this case, the plurality of elements including the MPLS labels are arranged in descending order in an arrangement sequence, of nodes corresponding to identifiers included in the elements, on the forwarding path. A plurality of MPLS labels inside each element may be arranged in ascending order or descending order in the arrangement sequence of the nodes on the forwarding path.

It is easy to understand that each element stores a maximum of four MPLS labels.

It is easy to understand that when the plurality of MPLS labels are stored in at least one element in the segment list, idle space may exist after a last MPLS in a last element, for example, a padding part shown in FIG. 5.

It should be noted that although the SIDs in the segment list shown in FIG. 5 are used to identify network devices on the SRv6 network, certainly, the SIDs in the segment list may alternatively be used to identify links on the SRv6 network.

The first-type identifier in the segment list may also include the compressed segment identifier whose length is less than 128 bits. Alternatively, the first-type identifier in the segment list may include both the segment identifier whose length is 128 bits and the compressed segment identifier whose length is less than 128 bits. This may be related to whether a network device on the forwarding path supports the compressed segment identifier. When a network device supports the compressed segment identifier, the network device may be indicated by the compressed segment identifier in the segment list. When a network device does not support the compressed segment identifier but supports only the segment identifier, the network device may be indicated by the segment identifier in the segment list. The MPLS label and the compressed segment identifier may be arranged in a same element in the segment list, and a length of the element is 128 bits. Alternatively, the MPLS label and the compressed segment identifier may not be arranged in a same element in the segment list. To be specific, a first MPLS label in the plurality of MPLS labels is arranged at a start location of a first element after the compressed segment identifier.

With reference to the scenario shown in FIG. 1, the packet including the segment list may alternatively be shown in FIG. 6. The segment list is included in the SRH. The segment list includes two types of identifiers. The first-type identifier includes a plurality of SIDs and a plurality of compressed segment identifiers, and specifically includes SIDs of the node B, the node K, and the node L, and C-SIDs of the node C, the node D, and the node F. These SIDs and C-SIDs are respectively represented as the SID B, a C-SID C, a C-SID D, a C-SID F, the SID K, and the SID L. The second-type identifier is a plurality of adjacent MPLS labels, and specifically includes the MPLS labels of the node G, the node H, and the node J. These MPLS labels are respectively represented as the MPLS G, the MPLS H, and the MPLS J.

The forwarding path on the SRv6 network is indicated by SIDs and compressed segment identifiers, such as the SID B, the C-SID C, the C-SID D, the SID K, and the SID L. The forwarding path on the MPLS network is indicated by MPLS labels, such as the MPLS G and the MPLS H. The forwarding path between the SRv6 network and the MPLS network may be indicated by an SID, a C-SID, or an MPLS label, for example, the C-SID F and the MPLS J.

Similar to the segment list shown in FIG. 5, in the segment list shown in FIG. 6, identifiers corresponding to all nodes are sequentially arranged in an arrangement sequence of these nodes on the forwarding path. Different from the segment list shown in FIG. 5, a plurality of compressed segment identifiers or a plurality of MPLS labels are arranged in each 128-bit element in the segment list, or a combination of a compressed segment identifier and an MPLS label is arranged in each 128-bit element in the segment list. A plurality of elements are arranged in descending order in an arrangement sequence, of nodes corresponding to identifiers included in the elements, on the forwarding path. As shown in FIG. 5, the SID B is arranged in the foremost of the segment list, and an entirety formed by the C-SID C, the C-SID D, the C-SID F and the MPLS G is arranged after the SID B. In other words, the MPLS labels and the compressed segment identifiers are arranged in a same element in the segment list. Then, an entirety formed by the MPLS H and the MPLS J is arranged. In each element, the compressed segment identifiers or the MPLS labels may be arranged in ascending order in an arrangement sequence of corresponding nodes on the forwarding path, as shown in FIG. 5. However, in each element, the compressed segment identifiers or the MPLS labels may alternatively be arranged in descending order in an arrangement sequence of the corresponding nodes on the forwarding path.

When the network 2 is the IPv4 network, the packet including the segment list may be shown in FIG. 7. The segment list is included in the SRH. The segment list includes two types of identifiers. Similar to the segment list in FIG. 5, the first-type identifier is a plurality of SIDs, and specifically includes the SID B, the SID C, the SID D, the SID F, the SID K, and the SID L. The second-type identifier includes two adjacent IPv4 addresses, and specifically includes IPv4 addresses of the node G and the node J. These addresses are respectively represented as IPv4 G and IPv4 J.

Similar to the segment list in FIG. 5, the forwarding path on the SRv6 network is indicated by SIDs, such as the SID B, the SID C, the SID D, the SID K and the SID L. A forwarding path on the IPv4 network is indicated by a source address and a destination address of a tunnel. The source address and the destination address of the tunnel each are an IPv4 address, for example, the IPv4 G and the IPv4 J.

In addition to the source address and the destination address of the tunnel, the segment list further includes a tunnel type field and a flexible length type specific argument field. A length of the tunnel type field is 8 bytes, that is, 64 bits, and the tunnel type field is used to indicate a tunnel type. Specifically, the tunnel type field is corresponding to a tunnel type by using a specific value. For example, a value of the tunnel type field being 1 indicates a 6 over 4 tunnel, the value of the tunnel type field being 2 indicates a VXLAN tunnel, the value of the tunnel type field being 3 indicates a GRE tunnel, and the like. The flexible length type specific argument field may carry some arguments related to the tunnel type. For example, when the tunnel type is 6 over 4, the flexible length type specific argument field may carry a time-to-live (TTL) value, to specify a maximum quantity of network segments that are allowed to pass through before the packet is discarded. A length of the flexible length type specific argument field is flexible, for example, 128 bits, 256 bits, 384 bits, or the like. The length is related to the tunnel type. These fields and the source address and the destination address of the tunnel may be collectively referred to as IPv4 tunnel arguments in the segment list. In other words, the IPv4 tunnel arguments are carried in the segment list, so that the forwarding path on the IPv4 network can be programmed in the segment list.

Optionally, a correspondence between the value of the tunnel type field and the tunnel type, a correspondence between the tunnel type and the length of the flexible length type specific argument field, and a correspondence between the tunnel type and a type-specific argument may be released by the controller to each node on the network and locally stored by each node.

Similar to the segment list shown in FIG. 5, in the segment list shown in FIG. 7, identifiers corresponding to all nodes are sequentially arranged in an arrangement sequence of these nodes on the forwarding path. Specifically, the SID B is arranged at the bottom of the segment list, and the SID C, the SID D, and the SID F are sequentially arranged upwards. The IPv4 tunnel arguments are arranged as an entirety above the SID F. Then, the SID K and the SID L are sequentially arranged above the IPv4 tunnel arguments. In the IPv4 tunnel arguments, lengths of the source address and the destination address of the tunnel which are IPv4 addresses each are 32 bits and a total is 64 bits, and the length of the tunnel type field is 64 bits. Therefore, the source address and the destination address of the tunnel and the tunnel type field are 128 bits in total and are arranged above the SID F as an entirety. An arrangement sequence of the flexible length type specific argument field, the source address and the destination address of the tunnel, and the tunnel type field may be specified on the network. For example, the flexible length type specific argument field may be arranged above the entirety formed by the source address and the destination address of the tunnel and the tunnel type field.

It can be learned that in this embodiment, in addition to the segment identifier or the compressed segment identifier used to identify the forwarding path of the packet on the SRv6 network, the segment list may further include the second-type identifier used to identify the forwarding path of the packet on the non-SRv6 network. Specifically, the second-type identifier may be an MPLS label or an IPv4 address. When there is the second-type identifier in the segment list, an indication identifier may be further set in the segment list, to indicate existence of the second-type identifier to a node on the forwarding path, and indicate a start location of the second-type identifier in the segment list.

Optionally, the indication identifier may be an independent identifier. In other words, the indication identifier is not included in the plurality of identifiers in the segment list. The independent indication identifier is located after the at least one first-type identifier and before the plurality of second-type identifiers. In other words, the independent indication identifier is arranged between the at least one first-type identifier and a first second-type identifier in the plurality of second-type identifiers. When reading the indication identifier, the node on the forwarding path learns that there are a plurality of second-type identifiers following the indication identifier. For example, a length of the indication identifier is 32 bits, which is the same as the length of the MPLS label and the length of the IPv4 address.

Optionally, the indication identifier may be included in the plurality of identifiers in the segment list. Specifically, the indication identifier is included in an end segment identifier. The end segment identifier is the first-type identifier. The end segment identifier is adjacent to a first identifier in the plurality of second-type identifiers, and the end segment identifier is located before the first identifier in the plurality of second-type identifiers. In other words, the end segment identifier is a last first-type identifier before the plurality of second-type identifiers. The end segment identifier is a segment identifier whose length is 128 bits or a compressed segment identifier whose length is less than 128 bits. For example, the end segment identifier may be the SID F in FIG. 5 or FIG. 7. Alternatively, the end segment identifier may be the C-SID F in FIG. 6.

When the indication identifier is located in the end segment identifier, the indication identifier may be used to identify a function on the SRv6 network, and the indication identifier is located in a function field of the end segment identifier. For example, when the second network is the MPLS network and the second-type identifier is the MPLS label, the indication identifier may indicate a newly defined function on the SRv6 network, and is represented as END.M. Specific content of the function is described in the following. For example, when the second network is the IPv4 network and the second-type identifier is the IPv4 address, the indication identifier may indicate a newly defined function on the SRv6 network, and is represented as END.4. Specific content of the function is described in the following.

When there is the second-type identifier in the segment list, and the second-type identifier is the MPLS label, an end identifier may be further set in the segment list, to indicate an end location of the plurality of MPLS labels in the segment list to the node on the forwarding path.

Optionally, the end identifier may be an independent identifier. In other words, the end identifier is not included in the plurality of identifiers in the segment list. The independent end identifier is located after the plurality of MPLS labels, and is adjacent to a last MPLS label in the plurality of MPLS labels. When reading the end identifier, the node on the forwarding path learns that the end location of the plurality of MPLS labels in the segment list have been reached. For example, a length of the end identifier is 32 bits, which is the same as the length of the MPLS label.

Optionally, the end identifier may be included in the last MPLS label in the plurality of MPLS labels. The end identifier may be a field in the MPLS label. When the field has a specific value, the field is used as the end identifier.

When there is the second-type identifier in the segment list, and the second-type identifier is the MPLS labels, a quantity identifier may be further set in the segment list, to indicate a quantity of the plurality of MPLS labels in the segment list to the node on the forwarding path. When reading the indication identifier, the node on the forwarding path learns that there are a plurality of MPLS labels following the indication identifier. In other words, the node learns a start location of the plurality of MPLS labels in the segment list. When reading the quantity identifier, the node may learn the quantity of the plurality of MPLS labels in the segment list. In this way, all of the plurality of MPLS labels can be learned from the segment list. A specific process is described in the following.

Optionally, the quantity identifier may be included in the end segment identifier. Optionally, when the indication identifier is located in the end segment identifier, and the indication identifier is used to identify the function on the SRv6 network, the quantity identifier may be an argument of the function. In other words, the quantity identifier is located in an argument field of the end segment identifier. For example, when the second network is the MPLS network and the second-type identifier is the MPLS label, the indication identifier may indicate the newly defined function on the SRv6 network, and is represented as END.M. The quantity identifier is an argument of the END. M. For example, when the second network is the IPv4 network and the second-type identifier is the IPv4 address, the indication identifier may indicate the newly defined function on the SRv6 network, and is represented as END.4. The quantity identifier is an argument of the END.4.

Optionally, the quantity identifier may be included in a first MPLS label in the plurality of MPLS labels.

Optionally, when the segment list is generated by the controller, the control packet that is of the segment list and that is sent by the controller to the node A may include a hybrid flag, to indicate that the plurality of identifiers in the segment list include the segment identifier or the compressed segment identifier that identifies the forwarding path of the packet on the SRv6 network, and the second-type identifier used to identify the forwarding path of the packet on the non-SRv6 network. Therefore, when receiving the control packet from the controller, the node A reads the hybrid flag, to learn that the segment list included in the control packet is a hybrid segment list or a generic segment list.

S130: The network device 101 sends the second packet.

The network device 101 may be the node A shown in FIG. 4. With reference to the scenario shown in FIG. 4, the node A sends the packet to which the segment list is added. The packet passes through the node B, the node C, and the node D, and reaches the node F. For forwarding processing processes of the packet at the node B, the node C, and the node D, refer to the foregoing description of the packet forwarding process on the SRv6 network. Details are not described herein again.

S140: The network device 102 receives the second packet from the first network, where a first packet header of the second packet includes the segment list, the segment list includes the plurality of sequentially arranged identifiers, each of the plurality of identifiers is used to identify one network device or one link, the plurality of identifiers include the at least one first-type identifier and the plurality of second-type identifiers, the type of the first-type identifier is different from the type of the second-type identifier, the network device or the link identified by the first-type identifier is on the first network, the network device or the link identified by the second-type identifier is on the second network, and the type of the first network is different from the type of the second network.

The network device 102 may be the node F shown in FIG. 4. With reference to the scenario shown in FIG. 4, the node F receives a packet from the SRv6 network, and an SRH of the packet includes the segment list. This packet is the packet sent by the node A, namely, the second packet. The SRH may be referred to as the first packet header of the second packet.

S150: The network device 102 encapsulates a second packet header for the second packet to form a third packet, where the second packet header includes the plurality of second-type identifiers.

The network device 102 may be the node F shown in FIG. 4. With reference to the scenario shown in FIG. 4, to enable the packet to be forwarded on the second network, the node F obtains the plurality of second-type identifiers from the segment list in the packet, and encapsulates the second packet header for the packet. The second packet header includes the plurality of second-type identifiers.

The node F may obtain the indication identifier from the packet. The indication identifier is used to indicate the start location of the second-type identifier. Therefore, when reading the indication identifier, the node F learns that there are a plurality of second-type identifiers following the indication identifier in the segment list.

With reference to the foregoing description, the indication identifier may be an independent identifier that is after the first-type identifier and before the plurality of second-type identifiers. Alternatively, the indication identifier may be included in the last first-type identifier before the plurality of second-type identifiers.

When the indication identifier is an independent identifier, the node F reads the indication identifier through a pointer in the SRH. The pointer in the SRH includes an SL pointer and/or a CL pointer. The SL pointer is used to indicate a location of the SID in the segment list or a location of an element including the compressed segment identifier and/or the MPLS label in the segment list. The CL pointer is used to indicate a location of the compressed segment identifier in the element. When receiving the packet, the node F determines a current to-be-processed identifier in the segment list based on the SL pointer, or determines the current to-be-processed identifier in the segment list based on the SL pointer and the CL pointer. The current to-be-processed identifier is the indication identifier. For a process in which the node F obtains the current to-be-processed identifier based on the SL pointer and/or the CL pointer, refer to descriptions of the draft-li-spring-compressed-srv6-np-00 entitled "Compressed SRv6 Network Programming" and dated July 2019, and the patent document No. 201910925974.3 filed on Sep. 27, 2019. Details are not described herein again.

When the indication identifier is included in the last first-type identifier before the plurality of second-type identifiers, with reference to the scenario shown in FIG. 4, the last first-type identifier is a segment identifier or a compressed segment identifier corresponding to the node F. According to a packet forwarding mechanism on the SRv6 network, when the node F receives the packet, the segment identifier or the compressed segment identifier corresponding to the node F is located in a DA field in an IPv6 packet header of the packet. The node F reads the indication identifier from the DA field. Further, the node F determines a current to-be-processed identifier in the segment list based on the SL pointer, or determines the current to-be-processed identifier in the segment list based on the SL pointer and the CL pointer. The current to-be-processed identifier is the first identifier in the plurality of second-type identifiers. For a process in which the node F obtains the current to-be-processed identifier based on the SL pointer and/or the CL pointer, refer to the descriptions of the draft-li-spring-compressed-srv6-np-00 entitled "Compressed SRv6 Network Programming" and dated July 2019, and the patent document No. 201910925974.3 filed on Sep. 27, 2019. Details are not described herein again.

The second packet header may be an MPLS header. In other words, the second packet header includes a plurality of MPLS labels, and the second-type identifier is an MPLS label.

When the plurality of second-type identifiers are a plurality of MPLS labels, the node F learns, based on the indication identifier, that there are a plurality of MPLS labels following the indication identifier, and learns a start location of the plurality of MPLS labels in the segment list, or learns a first MPLS label in the plurality of MPLS labels that are sequentially arranged.

Further, the node F may determine an end location of the plurality of MPLS labels in the segment list based on the end identifier. In other words, the node F may determine, based on the end identifier, a last MPLS label in the plurality of sequentially arranged MPLS labels, to determine all of the plurality of MPLS labels.

Alternatively, further, the node F may determine, based on the quantity identifier, a quantity of the plurality of sequentially arranged MPLS labels, to determine all of the plurality of MPLS labels. In addition, either the quantity identifier or the end identifier may be optionally set.

Figure 8:
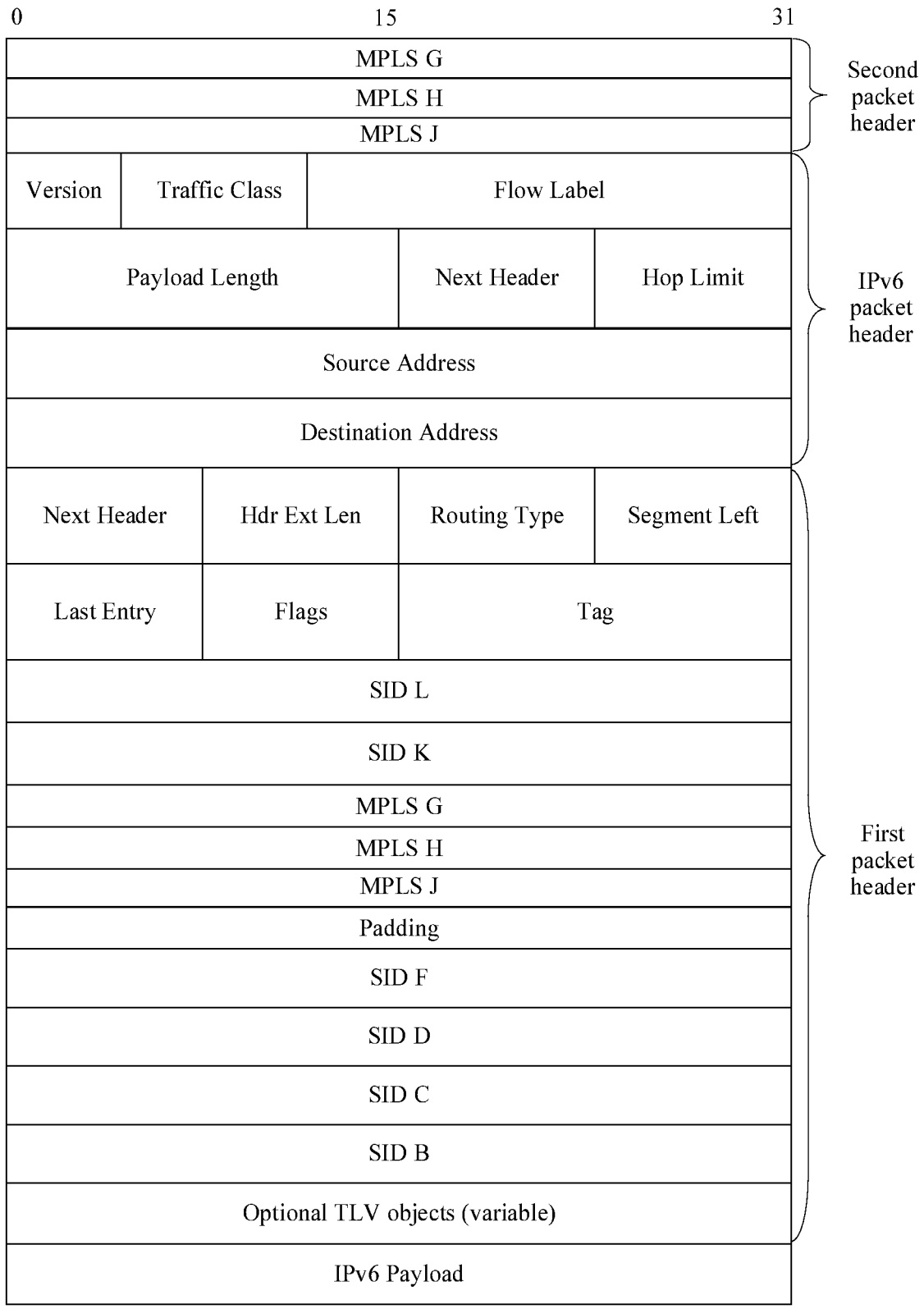
FIG. 8 is a schematic diagram of a structure of a packet according to an embodiment.

An example is used for description with reference to a packet structure shown in FIG. 5. For example, in the segment list of the packet shown in FIG. 5, the indication identifier is included in a function field of the SID F, and specifically identifies a function of the END.M; and the quantity identifier is included in an argument field of the SID F, and specifically identifies that the quantity of the MPLS labels is 3. When receiving the packet, the node F reads the SID F from the DA field in the IPv6 packet header of the packet. The node F learns, based on an identifier of the END.M included in the function field of the SID F, that there are a plurality of MPLS labels following the SID F in the segment list, and learns, based on the argument field, that the quantity of the MPLS labels is 3. Based on an indication of the SL pointer, the node F finds an element, whose length is 128 bits, that follows the SID F in the segment list. In other words, the element is an entirety including the MPLS G, the MPLS H, the MPLS J, and the padding. The node F obtains three 32-bit MPLS labels, namely, the MPLS G, the MPLS G, and the MPLS J from the element based on the quantity of MPLS labels being 3. The node F encapsulates the second packet header for the packet, where the second packet header includes the MPLS G, the MPLS G, and the MPLS J. According to a forwarding mechanism of the MPLS labels, in the second packet header, the foregoing three MPLS labels are sequentially arranged in a sequence of the nodes on the forwarding path. An MPLS label corresponding to a node that first arrives is arranged on a stack top, and an MPLS label corresponding to a node that subsequently arrives is sequentially arranged downwards. A structure of the packet after the second packet header is encapsulated is shown in FIG. 8. Three packet headers are encapsulated in the packet from inside out: the first packet header (the SRH), the IPv6 packet header, and the second packet header.

For example, in the segment list of the packet shown in FIG. 5, the indication identifier may alternatively be an independent identifier; the quantity identifier may alternatively be included in the MPLS G, or the quantity identifier may alternatively be replaced with the end identifier; and the end identifier may be an independent identifier, or the end identifier may alternatively be included in the MPLS J. A corresponding processing process is not described herein again.

Figure 9:
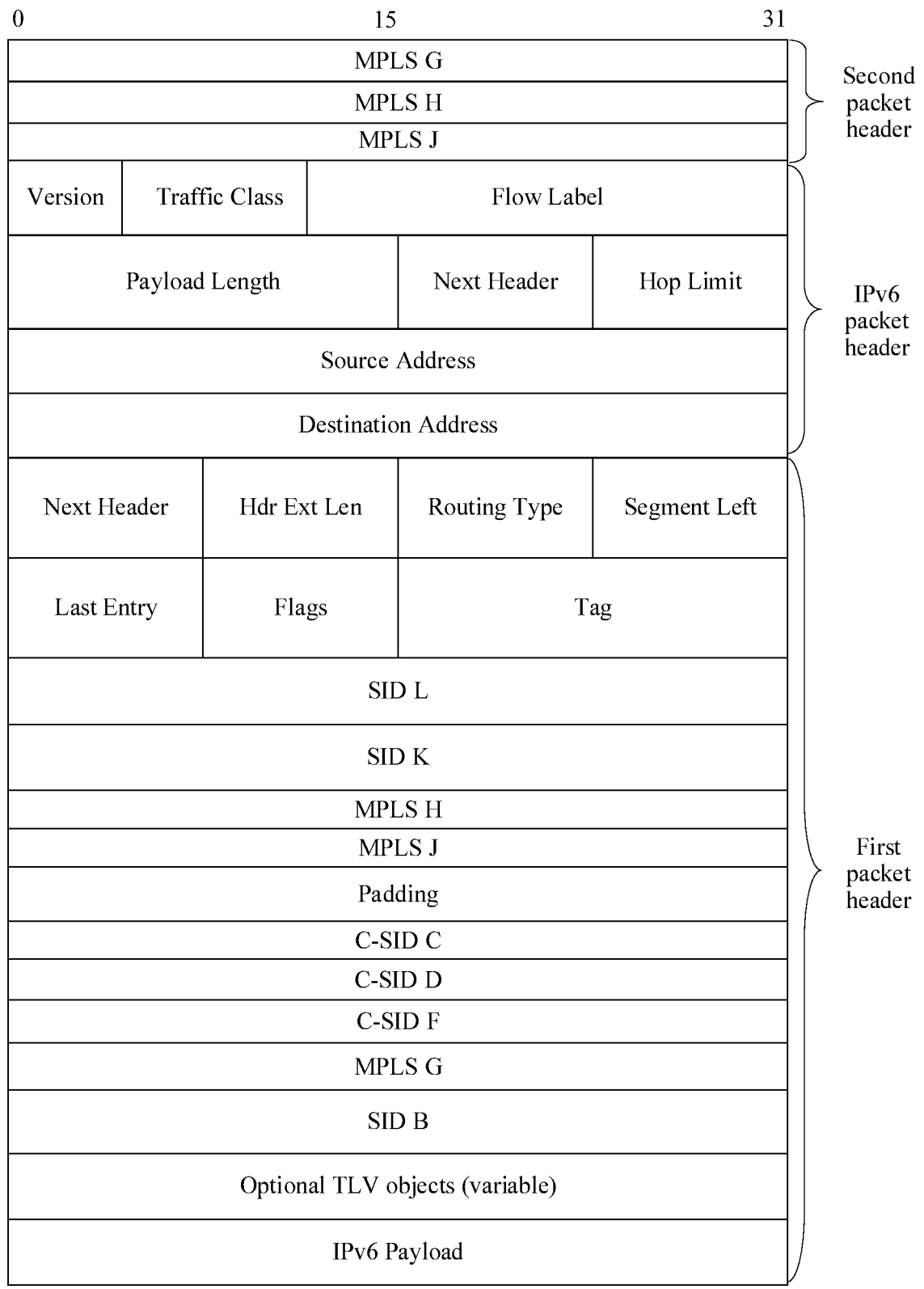
FIG. 9 is a schematic diagram of a structure of a packet according to an embodiment.

An example is used for description with reference to a packet structure shown in FIG. 6. For example, in the segment list of the packet shown in FIG. 6, the indication identifier is included in a function field of the C-SID F, and specifically identifies the function of the END.M; and the quantity identifier is included in an argument field of the C-SID F, and specifically identifies that the quantity of the MPLS labels is 3. When receiving the packet, the node F reads the SID-F formed by the C-SID F and the block part from the DA field in the IPv6 packet header of the packet. The node F learns, based on the identifier of the END.M included in the function field, that there are a plurality of MPLS labels following the C-SID F in the segment list, and learns, based on the argument field, that the quantity of the MPLS labels is 3. Based on an indication of the SL pointer, the node F finds an element, whose length is 128 bits, that includes the C-SID F in the segment list. In other words, the element is an entirety including the C-SID C, the C-SID D, the C-SID F and the MPLS G. The node F further finds, based on an indication of the CL pointer, an identifier following the C-SID F in the element, namely, the MPLS G. The node F obtains the MPLS G from the element based on the quantity of MPLS labels being 3, and obtains the MPLS H and the MPLS J from an element following the element. In this way, the node F obtains a total of three 32-bit MPLS labels. The node F encapsulates the second packet header for the packet, where the second packet header includes the MPLS G, the MPLS G, and the MPLS J. The structure of the packet after the second packet header is encapsulated is shown in FIG. 9. Three packet headers are encapsulated in the packet from inside out: the first packet header (the SRH), the IPv6 packet header, and the second packet header.

For example, in the segment lists of the packets shown in FIG. 5 and FIG. 6, the indication identifier may alternatively be an independent identifier; the quantity identifier may alternatively be included in the MPLS G, or the quantity identifier may alternatively be replaced with the end identifier; and the end identifier may be an independent identifier, or the end identifier may alternatively be included in the MPLS J. The corresponding processing process is not described herein again.

The second packet header may be an IPv4 header. In other words, the second packet header may include a plurality of IPv4 addresses, and the second-type identifier is an IPv4 address.

When the plurality of second-type identifiers are a plurality of IPv4 addresses, the node F learns, based on the indication identifier, that an IPv4 tunnel argument including the plurality of IPv4 addresses follows the indication identifier, and learns a start location of the IPv4 tunnel argument in the segment list.

Figure 10:
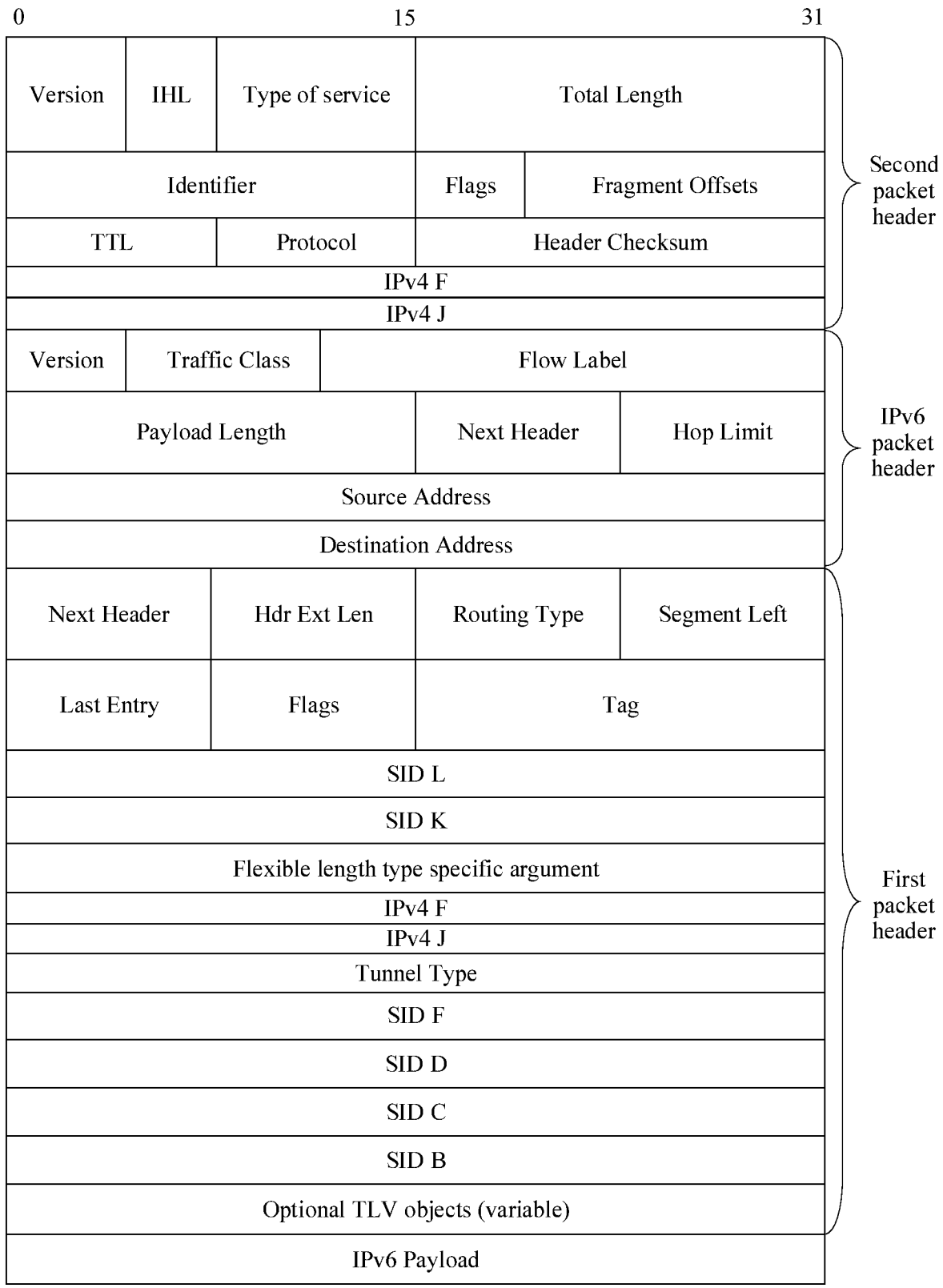
FIG. 10 is a schematic diagram of a structure of a packet according to an embodiment.

An example is used for description with reference to a packet structure shown in FIG. 7. For example, in the segment list of the packet shown in FIG. 7, the indication identifier is included in the function field of the SID F, and specifically identifies a function of the END.4. When receiving the packet, the node F reads the SID F from the DA field in the IPv6 packet header of the packet. The node F learns, based on an identifier of the END.4 included in the function field of the SID F, that the IPv4 tunnel argument including the plurality of IPv4 addresses follows the SID F in the segment list. Based on an indication of the SL pointer, the node F finds an element, whose length is 128 bits, that follows the SID F in the segment list. In other words, the element is an entirety including the source address and the destination address of the tunnel and the tunnel type field. The node F learns, based on a value of the tunnel type field, that the tunnel type is a 6 over 4 tunnel, and determines, based on the tunnel type being the 6 over 4 tunnel, that the length of the flexible length type specific argument field is 128 bits. The node F further determines, based on the tunnel type being the 6 over 4 tunnel, that the flexible length type specific argument field includes the TTL, and reads a TTL value from an element following the element. Therefore, the node F encapsulates the second packet header for the packet. The second packet header is an IPv4 packet header, and a source address and a destination address in the second packet header are respectively IPv4 addresses of the node F and the node J. The structure of the packet after the second packet header is encapsulated is shown in FIG. 10. Three packet headers are encapsulated in the packet from inside out: the first packet header (the SRH), the IPv6 packet header, and the second packet header.

For example, in the segment list of the packet shown in FIG. 7, the indication identifier may alternatively be an independent identifier. A corresponding processing process is not described herein again.

Optionally, after encapsulating the second packet header for the packet, the node F may continue to add a cross-domain identifier to the DA field in the IPv6 packet header of the packet. The cross-domain identifier is one of the plurality of identifiers in the segment list, and the cross-domain identifier is the first-type identifier in the segment list. Specifically, the cross-domain identifier is a segment identifier whose length is 128 bits or a compressed segment identifier whose length is less than 128 bits that corresponds to a first node on the first network that the packet reaches after passing through the second network. With reference to the scenario shown in FIG. 4, the cross-domain identifier may be an SID or a compressed segment identifier corresponding to the node J.

Optionally, after encapsulating the second packet header for the packet, the node F may update a value of the SL pointer, so that the SL pointer is enabled to point to a first segment following a plurality of segments that carry the MPLS labels. In other words, the SL pointer is enabled to point to an element whose length is 128 bits and in which a first identifier following the plurality of MPLS labels in the segment list is located.

Optionally, after encapsulating the second packet header for the packet, the node F may update a value of the CL pointer, for example, return the value of the CL pointer to zero, so that the CL pointer is enabled to point to a start location of the element.

S160: The network device 102 sends the third packet to the second network.

The network device 102 may be the node F shown in FIG. 4. With reference to the scenario shown in FIG. 4, the node F sends, to the second network, a packet in which the second packet header is encapsulated. The packet is a packet sent by the node F, namely, the third packet.

When the second-type identifier is an MPLS label, the node F sends the packet in which the second packet header is encapsulated to the node identified by the MPLS label on the stack top in the second packet header. In other words, the node F sends the packet to the node G. According to a forwarding mechanism of an MPLS label stack, the packet passes through the node G and the node H, and reaches the node J. Forwarding processing processes of the packet at the node G, the node H, and the node J are not described herein again.

When the second type identifier is an IPv4 address, the node F queries an IPv4 forwarding information base (FIB) based on the destination address in the IPv4 packet header, and sends, based on a query result through a tunnel between the node F and the node J, the packet in which the second packet header is encapsulated. The packet passes through the node G and the node H, and reaches the node J.

The node J receives the packet from the second network, deletes the second packet header in the packet, retains the IPv6 packet header and the SRH, and continues to send the packet to the SRv6 network according to the packet forwarding mechanism on the SRv6 network. In other words, the node J sends the packet to the node K. For example, in this case, the DA field in the IPv6 packet header of the packet includes an SID corresponding to the node J, and the node J performs forwarding processing on the packet based on processing content of a segment identified by the SID.

The packet continues to pass through the node K, and reaches the node L. For forwarding processing processes of the packet at the node K and the node L, refer to the foregoing description of the packet forwarding process on the SRv6 network. Details are not described herein again.

On an actual network, a forwarding path of a packet may be generated by a controller, or may be generated by an ingress node on the forwarding path. When the controller generates the forwarding path of the packet, the controller also generates a segment list indicating the forwarding path. The segment list may be a segment list including the first-type identifier and the second-type identifier, namely, a hybrid segment list or a generic segment list. The controller sends the segment list to the ingress node on the forwarding path. After receiving a packet, the ingress node on the forwarding path determines a forwarding path of the packet from several forwarding paths stored in the device, and determines a segment list corresponding to the forwarding path. The segment list is added to the packet, to guide forwarding of the packet.

Figure 12:
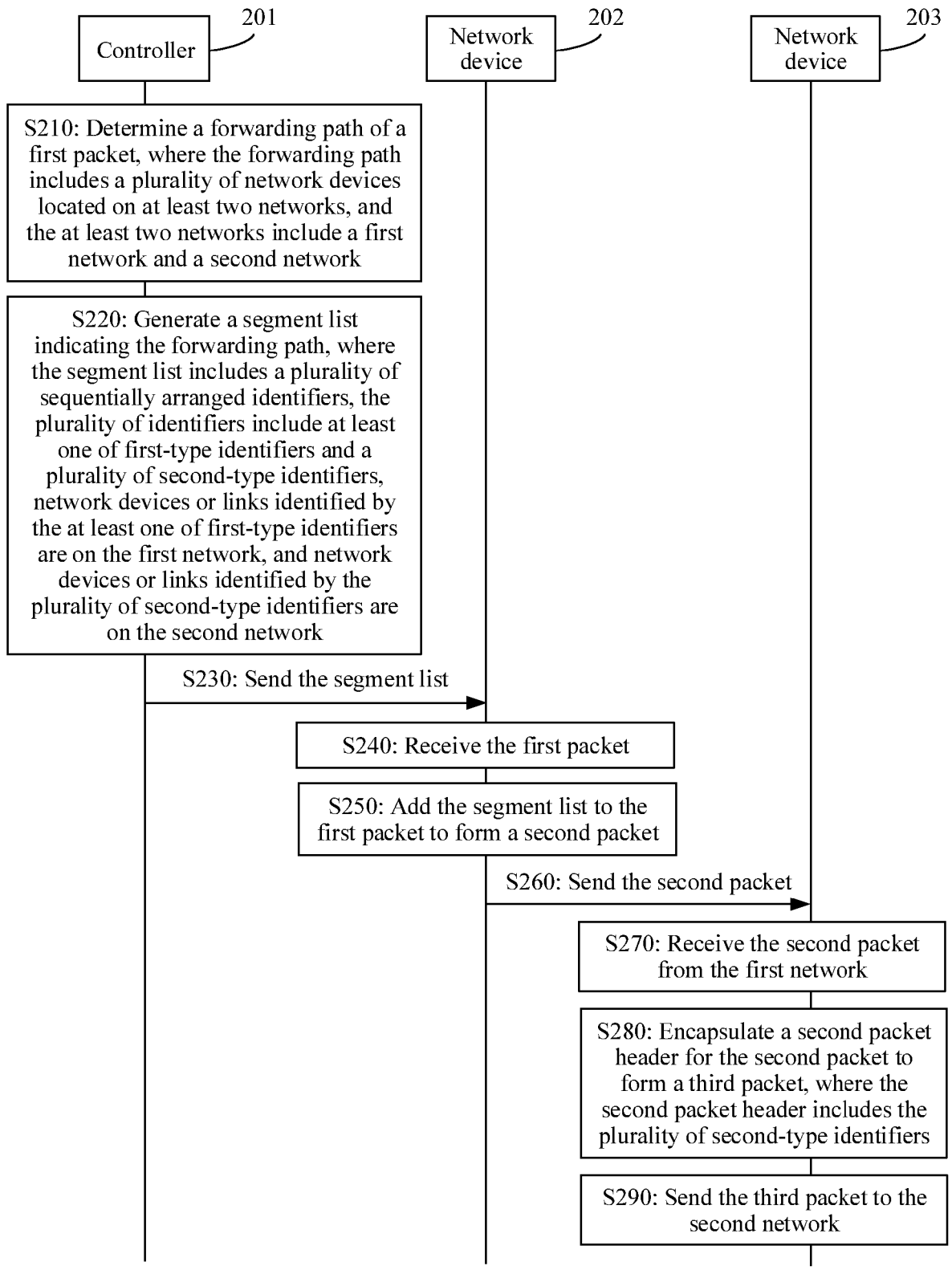
FIG. 12 is a flowchart of a packet processing method according to an embodiment.

An embodiment provides a packet forwarding method. FIG. 12 is a flowchart of the method. The method is applied to a controller 201, a network device 202, and a network device 203. The controller 201 may be a controller on a network, and is configured to calculate a forwarding path of a packet and generate a segment list indicating the forwarding path. For example, the controller 201 may be the controller in the scenario shown in FIG. 4, but the controller is not shown in FIG. 4. The network device 202 may be an ingress device on the forwarding path of the packet, and is configured to add, to the packet, the segment list indicating the forwarding path of the packet. For example, the network device 202 is the node A shown in FIG. 4. The network device 203 may be a node on the forwarding path, for example, the node F shown in FIG. 4. The method includes the following steps.

S210: The controller 201 determines a forwarding path of a first packet, where the forwarding path includes a plurality of network devices located on at least two networks, the at least two networks include a first network and a second network, and a type of the first network is different from a type of the second network.

The controller 201 may be the controller in the scenario shown in FIG. 4. With reference to the scenario shown in FIG. 4, the first network may be the SRv6 network, and the first network may include the network 1 and the network 3. The second network may be the network 2. The first packet enters the network 1 from the node A, and the forwarding path of the first packet passes through the node B, the node C, the node D, the node F, the node G, the node H, the node J, and the node K, and reaches the node L. It can be learned that the forwarding path includes a plurality of network devices located on the network 1, the network 2, and the network 3, and a type of the network 1 and the network 3 is different from a type of the network 2.

S220: The controller 201 generates the segment list corresponding to the forwarding path, where the segment list includes the plurality of sequentially arranged identifiers, each of the plurality of identifiers corresponds to one of the plurality of network devices or one link on the forwarding path, the plurality of identifiers include at least one first-type identifier and a plurality of second-type identifiers, a type of the first-type identifier is different from a type of the second-type identifier, a network device or a link identified by the first-type identifier is on the first network, and a network device or a link identified by the second-type identifier is on the second network.

With reference to the scenario shown in FIG. 4, the first-type identifier in the segment list is used to identify a segment or a compressed segment of a forwarding path of the packet on the SRv6 network, and the second-type identifier is used to identify a forwarding path of the packet on a non-SRv6 network. In this case, the segment list may also be referred to as a hybrid segment list or a generic segment list. An SRH including the generic segment list may be referred to as a generic segment routing header. The network device or the link identified by the first-type identifier is on the network 1 and the network 3. The first-type identifier is a segment identifier whose length is 128 bits or a compressed segment identifier whose length is less than 128 bits. The second network may be an MPLS network or an IPv4 network. Network devices or links identified by the plurality of second-type identifiers are on the network 2. The second-type of identifier includes an MPLS label or an IPv4 address. The plurality of second-type identifiers are adjacent to each other.

S230: The controller 201 sends the segment list to the network device 202.

With reference to the scenario shown in FIG. 4, the controller sends a control packet to the node A, and the control packet includes the segment list. Optionally, the control packet that is of the segment list and that is sent by the controller to the node A may include a hybrid flag, to indicate that the plurality of identifiers in the segment list include the segment identifier or the compressed segment identifier that identifies the forwarding path of the packet on the SRv6 network, and the second-type identifier used to identify the forwarding path of the packet on the non-SRv6 network. Therefore, when receiving the control packet from the controller, the node A reads the hybrid flag, to learn that the segment list included in the control packet is a hybrid segment list or a generic segment list.

S240: The network device 202 receives the first packet.

The network device 202 may be the node A shown in FIG. 4. With reference to the scenario shown in FIG. 4, for a specific process of the step S240, refer to the description of the step S110. Similarities are not described again.

S250: The network device 202 adds the segment list to the first packet to form a second packet, where the segment list indicates a forwarding path of the second packet, the forwarding path includes the plurality of network devices, the segment list includes the plurality of sequentially arranged identifiers, each of the plurality of identifiers is used to identify one of the plurality of network devices or one link on the forwarding path, the plurality of identifiers include the at least one first-type identifier and the plurality of second-type identifiers, the type of the first-type identifier is different from the type of the second-type identifier, the network device or the link identified by the first-type identifier is on the first network, the network device or the link identified by the second-type identifier is on the second network, and the type of the first network is different from the type of the second network.

With reference to the scenario shown in FIG. 4, for a specific process of the step S250, refer to the description of the step S120. Similarities are not described again.

S260: The network device 202 sends the second packet.

With reference to the scenario shown in FIG. 4, for a specific process of the step S260, refer to the description of the step S130. Similarities are not described again.

S270: The network device 203 receives the second packet from the first network, where a first packet header of the second packet includes the segment list, the segment list includes the plurality of sequentially arranged identifiers, each of the plurality of identifiers is used to identify one network device or one link, the plurality of identifiers include the at least one first-type identifier and the plurality of second-type identifiers, the type of the first-type identifier is different from the type of the second-type identifier, the network device or the link identified by the first-type identifier is on the first network, the network device or the link identified by the second-type identifier is on the second network, and the type of the first network is different from the type of the second network.

The network device 203 may be the node F shown in FIG. 4. With reference to the scenario shown in FIG. 4, for a specific process of the step S270, refer to the description of the step S140. Similarities are not described again.

S280: The network device 203 encapsulates a second packet header for the second packet to form a third packet, where the second packet header includes the plurality of second-type identifiers.

With reference to the scenario shown in FIG. 4, for a specific process of the step S280, refer to the description of the step S150. Similarities are not described again.

S290: The network device 203 sends the third packet to the second network.

With reference to the scenario shown in FIG. 4, for a specific process of the step S290, refer to the description of the step S160. Similarities are not described again.

Figure 13:
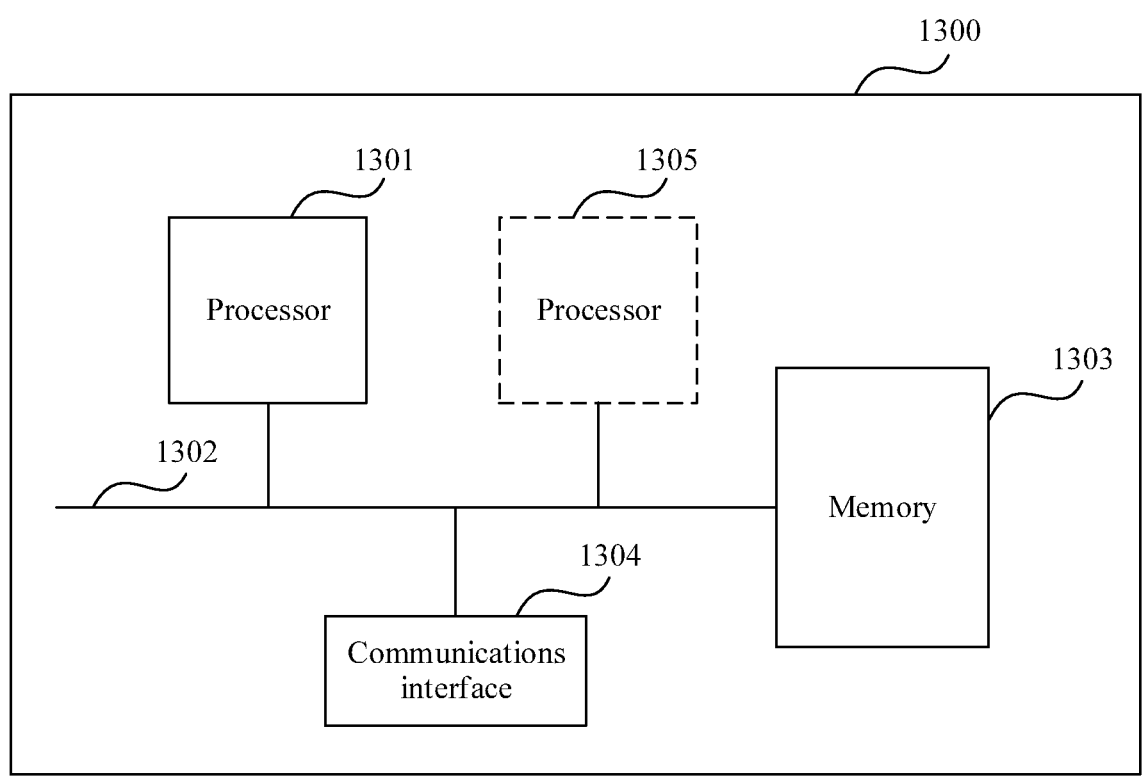
FIG. 13 is a schematic diagram of a structure of a network device according to an embodiment.

FIG. 13 is a schematic diagram of a structure of a device 1300 according to an embodiment. Any network device in the scenario shown in FIG. 4 may be implemented by using the device shown in FIG. 13. For example, the node A and the node F may be implemented by using the device shown in FIG. 13. The network device 101 and the network device 102 in the embodiment shown in FIG. 11, and the controller 201, the network device 202, and the network device 203 in the embodiment shown in FIG. 12 may be implemented by using the device shown in FIG. 13. In FIG. 13, the device 1300 includes at least one processor 1301 and at least one communications interface 1304. Optionally, the device 1300 may further include a memory 1303.

The processor 1301 may be a central processing unit (CPU), a general-purpose processor, a digital signal processor (DSP), an application-specific integrated circuit (ASIC), a field-programmable gate array (FPGA), or another programmable logic device, a transistor logic device, a hardware component, or any combination thereof. The processor 1301 may implement or execute various logical blocks, modules, and circuits described with reference to content disclosed in the embodiments. Alternatively, the processor may be a combination implementing a computing function, for example, a combination of one or more microprocessors, or a combination of a DSP and a microprocessor. The processor may be configured to generate a segment list, or process a received packet, and further forward the processed packet through the communications interface, to implement the method provided in the embodiments.

For example, when a controller on a network is implemented by using the device shown in FIG. 13, the processor may be configured to generate a segment list, so that a network device can forward a corresponding packet based on the segment list. For specific function implementation, refer to a processing part of the controller in the method embodiment. For example, when the network ingress device in FIG. 4 is implemented by using the device shown in FIG. 13, the processor may be configured to add a segment list to a received packet, so that a network device subsequently can forward the packet based on the segment list in the packet. For specific function implementation, refer to a processing part of the network ingress device in the method embodiment. For another example, when the forwarding device on the network in FIG. 4 is implemented by using the device shown in FIG. 13, the processor may be configured to forward a packet based on a segment list in the packet. For specific function implementation, refer to a processing part of the forwarding device in the method embodiment.

The communications bus 1302 is configured to transmit information between the processor 1301, the communications interface 1304, and the memory 1303. The bus may be a peripheral component interconnect (PCI) bus, an Extended Industry Standard Architecture (EISA) bus, or the like. The bus may be classified into an address bus, a data bus, a control bus, and the like. For ease of representation, only one thick line is used to represent the bus in FIG. 13, but this does not mean that there is only one bus or only one type of bus.

The memory 1303 may be a read-only memory (ROM) or another type of static storage device capable of storing static information and instructions, or a random-access memory (RAM) or another type of dynamic storage device capable of storing information and instructions, or may be an electrically erasable programmable ROM (EEPROM), a compact disc ROM (CD-ROM) or other compact disc storage, optical disc storage (including a compressed optical disc, a laser disc, an optical disc, a digital versatile disc (DVD), a Blu-ray optical disc, or the like), a magnetic disk storage medium or another magnetic storage device, or any other medium capable of carrying or storing expected program code in a form of an instruction or a data structure and capable of being accessed by a computer. This is not limited thereto. The memory 1303 may exist independently, and be connected to the processor 1301 through the communications bus 1302. The memory 1303 may alternatively be integrated into the processor 1301.

Optionally, the memory 1303 is configured to store program code or an instruction for executing the solutions, and the processor 1301 controls execution. The processor 1301 is configured to execute the program code stored in the memory 1303. The program code may include one or more software modules. Optionally, the processor 1301 may alternatively store program code or an instruction for executing the solutions.

The communications interface 1304 is configured to use any apparatus such as a transceiver to communicate with another device or communications network. The communications network may be the Ethernet, a radio access network (RAN), a wireless local area network (WLAN), or the like. In this embodiment, the communications interface 1304 may be configured to receive a packet sent by another node on a segment routing network, or send a packet to the another node on the segment routing network. The communications interface 1304 may be an Ethernet interface, a Fast Ethernet (FE) interface, a Gigabit Ethernet (GE) interface, an Asynchronous Transfer Mode (ATM) interface, or the like.

In a specific implementation, in an embodiment, the device 1300 may include a plurality of processors, for example, the processor 1301 and a processor 1305 that are shown in FIG. 13. Each of the processors may be a single-core processor (single-CPU) or a multi-core processor (multi-CPU). The processor herein may refer to one or more devices, circuits, and/or processing cores configured to process data (for example, a computer program instruction).

Figure 14:
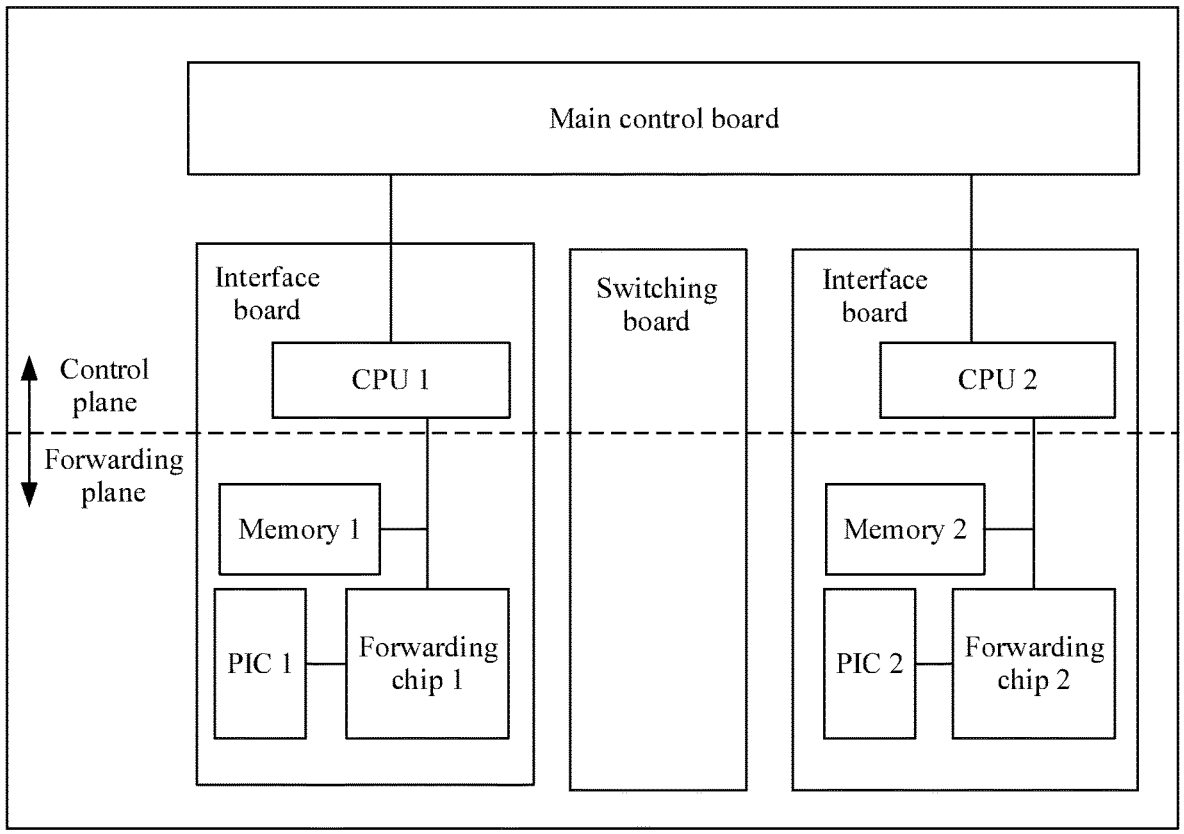
FIG. 14 is a schematic diagram of a structure of a network device according to an embodiment.

FIG. 14 is a schematic diagram of a structure of a device 1400 according to an embodiment. Any network device other than the controller in FIG. 4 may be implemented by using the device shown in FIG. 14. The network device 101 and the network device 102 in the embodiment shown in FIG. 11, and the network device 202 and the network device 203 in the embodiment shown in FIG. 12 may be implemented by using the device shown in FIG. 14. Refer to the schematic diagram of the structure of the device shown in FIG. 14. The device 1400 includes a main control board and one or more interface boards. The main control board and the interface boards are communicatively connected. The main control board is also referred to as a main processing unit (MPU) or a route processor card. The main control board is responsible for controlling and managing each component in the device 1400, including route computation, device management, and function maintenance. The interface board is also referred to as a line processing unit (LPU) or a line card, and is configured to forward data. In some embodiments, the device 1400 may also include a switching board. The switching board is communicatively connected to the main control board and the interface boards. The switching board is configured to forward data between the interface boards. The switching board may also be referred to as a switch fabric unit (SFU). The interface board includes a central processing unit, a memory, a forwarding chip, and a physical interface card (PIC). The central processing unit is separately communicatively connected to the memory, a network processor, and the physical interface card. The memory is configured to store a forwarding table. The forwarding chip is configured to forward a received data frame based on the forwarding table stored in the memory. If a destination address of the data frame is an address of the device 1400, the data frame is sent to the CPU for processing. If the destination address of the data frame is not the address of the device 1400, a next hop and an outbound interface that are corresponding to the destination address are found in the forwarding table based on the destination address, and the data frame is forwarded to the outbound interface corresponding to the destination address. The forwarding chip may be a network processor (NP). The PIC, also referred to as a subcard, may be installed on the interface board. The PIC is responsible for converting an optical or electrical signal into a data frame, checking validity of the data frame, and forwarding the data frame to the forwarding chip for processing. In some embodiments, the central processing unit may also perform a function of the forwarding chip, for example, implement software forwarding based on a general-purpose CPU, so that the interface board does not need the forwarding chip. A communication connection between the main control board, the interface boards, and the switching board may be implemented through a bus. In some embodiments, the forwarding chip may be implemented as an ASIC or an FPGA.

Logically, the device 1400 includes a control plane and a forwarding plane. The control plane includes the main control board and the central processing unit. The forwarding plane includes components for performing forwarding, such as the memory, the PIC, and the NP. The control plane performs functions such as a function of a router, generating a forwarding table, processing signaling and protocol packets, and configuring and maintaining a status of a PE 1. The control plane delivers the generated forwarding table to the forwarding plane. On the forwarding plane, the NP searches the forwarding table delivered by the control plane to forward, based on content in the forwarding table, a packet received by the PIC of the device 1400. The forwarding table delivered by the control plane may be stored in the memory. In some embodiments, the control plane and the forwarding plane may be separated, and are not on a same device.

Figure 15:
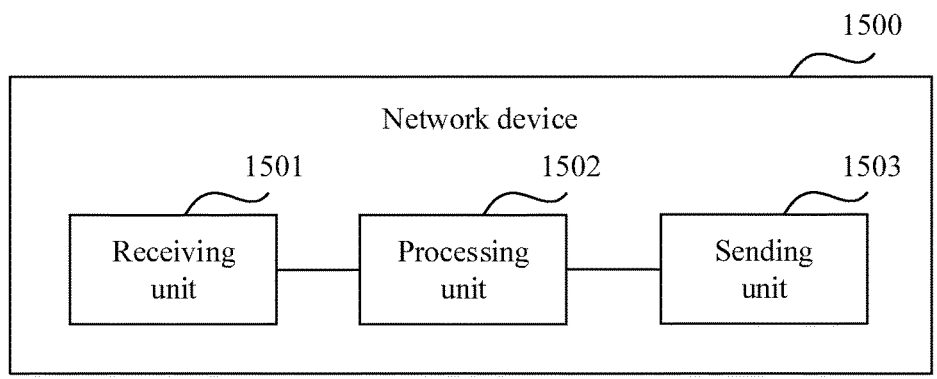
FIG. 15 is a schematic diagram of a structure of a network device according to an embodiment.

FIG. 15 is a schematic diagram of a possible structure of the network device in the foregoing embodiments. A network device 1500 may implement a function of the network device 102 or the network device 203 in the foregoing embodiments. In FIG. 15, the network device 1500 includes a receiving unit 1501, a processing unit 1502, and a sending unit 1503. These units may perform a corresponding function of the network device 102 or the network device 203 in the foregoing method. An example is as follows:

The receiving unit 1501 is configured to receive a first packet from a first network. A first packet header of the first packet includes a segment list. The segment list includes a plurality of sequentially arranged identifiers. Each of the plurality of identifiers is used to identify one network device or one link. The plurality of identifiers include at least one first-type identifiers and a plurality of second-type identifiers. A type of the first-type identifier is different from a type of the second-type identifier. A network device or a link identified by the first-type identifier is on the first network. A network device or a link identified by the second-type identifier is on a second network. A type of the first network is different from a type of the second network.

The processing unit 1502 is configured to encapsulate a second packet header for the first packet to form a second packet. The second packet header includes the plurality of second-type identifiers.

The sending unit 1503 is configured to send the second packet to the second network.

The network device 1500 may alternatively be implemented by using the device shown in FIG. 13. In this case, the network device 1500 includes at least one processor, a communications bus, and at least one communications interface. Optionally, the network device 1500 may further include a memory.

In a specific embodiment, the processor in the network device 1500 is configured to receive a first packet from a first network through the communications interface. A first packet header of the first packet includes a segment list. The segment list includes a plurality of sequentially arranged identifiers. Each of the plurality of identifiers is used to identify one network device or one link. The plurality of identifiers includes at least one first-type identifier and a plurality of second-type identifiers. A type of the first-type identifier is different from a type of the second-type identifier. A network device or a link identified by the first-type identifier is on the first network. A network device or a link identified by the second-type identifier is on a second network. A type of the first network is different from a type of the second network. The processor is further configured to encapsulate a second packet header for the first packet to form a second packet, where the second packet header includes the plurality of second-type identifiers; and send the second packet to the second network through the communications interface. For a detailed processing process of the processor, refer to detailed descriptions of the process of S140, S150, and S160 and the process of S270, S280, and S290 in the foregoing embodiment. Details are not described herein again.

The communications interface in the network device 1500 is used by the network device 1500 to receive and send packets through a network system. For a specific process, refer to detailed descriptions of S140, S160, S270, and S290 in the foregoing embodiments. Details are not described herein again.

The network device 1500 may alternatively be implemented by using the device shown in FIG. 14. In this case, the network device 1500 includes a main control board and one or more interface boards. The main control board and the interface boards are communicatively connected. For details, refer to the description of the network device 1400 in the foregoing embodiment. Details are not described herein again.

Figure 16:
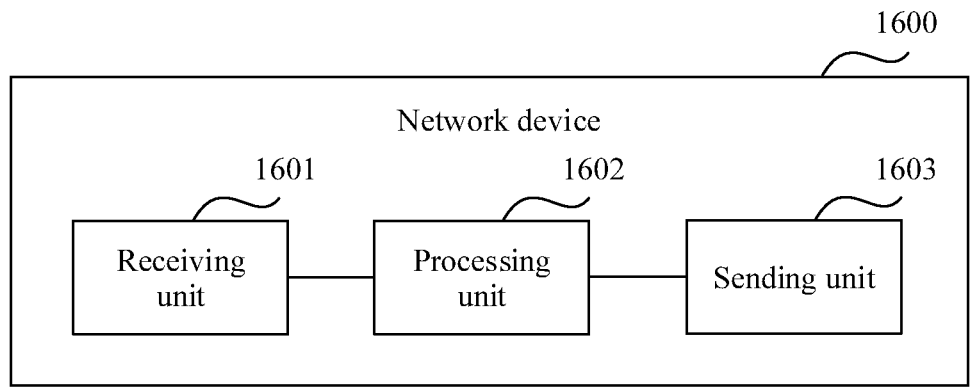
FIG. 16 is a schematic diagram of a structure of a network device according to an embodiment.

FIG. 16 is a schematic diagram of a possible structure of the network device in the foregoing embodiments. A network device 1600 may implement a function of the network device 101 or the network device 202 in the foregoing embodiments. In FIG. 16, the network device 1600 includes a receiving unit 1601, a processing unit 1602, and a sending unit 1603. These units may perform a corresponding function of the network device 101 or the network device 202 in the foregoing method. An example is as follows:

The receiving unit 1601 is configured to receive a first packet.

The processing unit 1602 is configured to add a segment list to the first packet to form a second packet. The segment list indicates a forwarding path of the second packet. The forwarding path includes a plurality of network devices. The segment list includes a plurality of sequentially arranged identifiers. Each of the plurality of identifiers is used to identify one of the plurality of network devices or one link on the forwarding path. The plurality of identifiers include at least one first-type identifier and a plurality of second-type identifiers. A type of the first-type identifier is different from a type of the second-type identifier. A network device or a link identified by the first-type identifier is on a first network. A network device or a link identified by the second-type identifier is on a second network. A type of the first network is different from a type of the second network.

The sending unit 1603 is configured to send the second packet.

The network device 1600 may alternatively be implemented by using the device shown in FIG. 13. In this case, the network device 1600 includes at least one processor, a communications bus, and at least one communications interface. Optionally, the network device 1600 may further include a memory.

In a specific embodiment, the processor in the network device 1600 is configured to receive a first packet through the communications interface, and add a segment list to the first packet to form a second packet. The segment list indicates a forwarding path of the second packet. The forwarding path includes a plurality of network devices. The segment list includes a plurality of sequentially arranged identifiers. Each of the plurality of identifiers is used to identify one of the plurality of network devices or one link on the forwarding path. The plurality of identifiers include at least one first-type identifier and a plurality of second-type identifiers. A type of the first-type identifier is different from a type of the second-type identifier. A network device or a link identified by the first-type identifier is on a first network. A network device or a link identified by the second-type identifier is on a second network. A type of the first network is different from a type of the second network. The processor is further configured to send the second packet through the communications interface. For a detailed processing process of the processor, refer to detailed descriptions of the process of S110, S120, and S130 and the process of S240, S250, and S260 in the foregoing embodiment. Details are not described herein again.

The communications interface in the network device 1600 is used by the network device 1600 to receive and send packets through a network system. For a specific process, refer to detailed descriptions of S110, S130, S240, and S260 in the foregoing embodiments. Details are not described herein again.

The network device 1600 may alternatively be implemented by using the device shown in FIG. 14. In this case, the network device 1600 includes a main control board and one or more interface boards. The main control board and the interface boards are communicatively connected. For details, refer to the description of the network device 1400 in the foregoing embodiment. Details are not described herein again.

Figure 17:
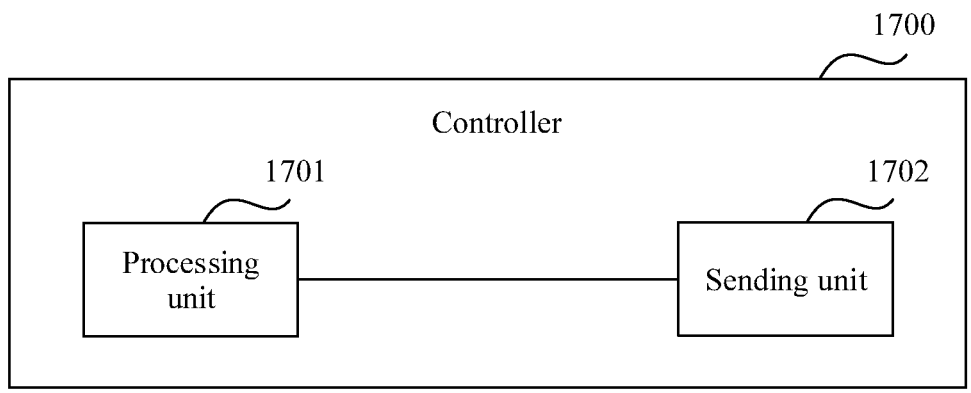
FIG. 17 is a schematic diagram of a structure of a controller according to an embodiment.

FIG. 17 is a schematic diagram of a possible structure of the controller 201 in the foregoing embodiment. A controller 1700 may implement a function of the controller 201 in the foregoing embodiment. In FIG. 17, the controller 1700 includes a processing unit 1701 and a sending unit 1702. These units may perform a corresponding function of the controller 201 in the foregoing method. An example is as follows:

The processing unit 1701 is configured to: determine a forwarding path of a packet, where the forwarding path includes a plurality of network devices located on at least two networks, the at least two networks include a first network and a second network, and a type of the first network is different from a type of the second network; and generate the segment list corresponding to the forwarding path. The segment list includes the plurality of sequentially arranged identifiers. Each of the plurality of identifiers corresponds to one of the plurality of network devices or one link on the forwarding path. The plurality of identifiers include at least one first-type identifier and a plurality of second-type identifiers. A type of the first-type identifier is different from a type of the second-type identifier. A network device or a link identified by the first-type identifier is on the first network. A network device or a link identified by the second-type identifier is on the second network.

The sending unit 1702 is configured to send the segment list to an ingress device on the forwarding path.

The controller 1700 may alternatively be implemented by using the device shown in FIG. 13. In this case, the controller 1700 includes at least one processor, a communications bus, and at least one communications interface. Optionally, the controller 1700 may further include a memory.

In a specific embodiment, the processor in the controller 1700 is configured to determine a forwarding path of a packet, where the forwarding path includes a plurality of network devices located on at least two networks, the at least two networks include a first network and a second network, and a type of the first network is different from a type of the second network; and generate the segment list corresponding to the forwarding path. The segment list includes the plurality of sequentially arranged identifiers. Each of the plurality of identifiers corresponds to one of the plurality of network devices or one link on the forwarding path. The plurality of identifiers include at least one first-type identifier and a plurality of second-type identifiers. A type of the first-type identifier is different from a type of the second-type identifier. A network device or a link identified by the first-type identifier is on the first network. A network device or a link identified by the second-type identifier is on the second network. The processor is further configured to send the segment list to the ingress device on the forwarding path through the communications interface.

For a detailed processing process of the processor, refer to detailed descriptions of the process of S210, S220, and S230 in the foregoing embodiment. Details are not described herein again.

The communications interface in the controller 1700 is used by the controller 1700 to receive and send information through a network system. For a specific process, refer to the detailed description of S230 in the foregoing embodiment. Details are not described herein again.

Figure 18:
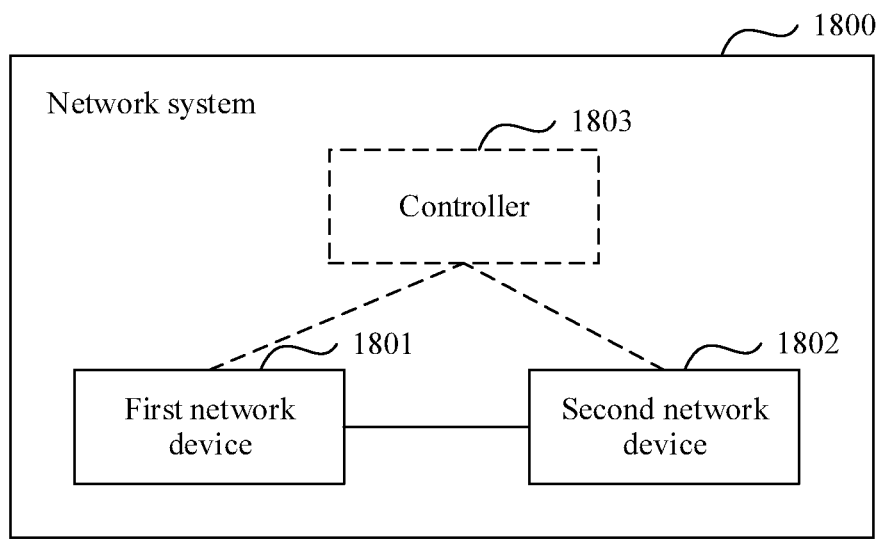
FIG. 18 is a schematic diagram of a structure of a network system according to an embodiment.

Refer to FIG. 18. FIG. 18 is a schematic diagram of a possible structure of a network system according to an embodiment. The network system 1800 includes a first network device 1801 and a second network device 1802. The first network device 1801 in the network system may perform processing steps S140, S150, and S160 of the network device 102 in the embodiment shown in FIG. 11, or processing steps S270, S280, and S290 of the network device 203 in the embodiment shown in FIG. 12. The second network device 1802 in the network system may perform processing steps S110, S120, and S130 of the network device 101 in the embodiment shown in FIG. 11, or processing steps S240, S250, and S260 of the network device 202.

Optionally, the network system 1800 further includes a controller 1803. The controller 1803 in the network system may perform processing steps S210, S220, and S230 of the controller 201 in the embodiment shown in FIG. 12.

Correspondingly, the first network device 1801 in the network system may be the network device 1600 in the embodiment shown in FIG. 16. The second network device 1802 in the network system may be the network device 1500 in the embodiment shown in FIG. 15. The controller 1803 in the network system may be the controller 1700 in the embodiment shown in FIG. 17.

Specifically, the controller is configured to determine a forwarding path of a packet. The forwarding path includes a plurality of network devices located on at least two networks. The at least two networks include a first network and a second network. A type of the first network is different from a type of the second network. The controller is further configured to generate the segment list corresponding to the forwarding path. The segment list includes the plurality of sequentially arranged identifiers. Each of the plurality of identifiers corresponds to one of the plurality of network devices or one link on the forwarding path. The plurality of identifiers include at least one first-type identifier and a plurality of second-type identifiers. A type of the first-type identifier is different from a type of the second-type identifier. A network device or a link identified by the first-type identifier is on a first network. A network device or a link identified by the second-type identifier is on a second network. The controller is further configured to send the segment list to an ingress device on the forwarding path.

The second network device is configured to receive a first packet, and add a segment list to the first packet to form a second packet. The segment list indicates a forwarding path of the second packet. The forwarding path includes a plurality of network devices. The segment list includes a plurality of sequentially arranged identifiers. Each of the plurality of identifiers is used to identify one of the plurality of network devices or one link on the forwarding path. The plurality of identifiers include at least one first-type identifier and a plurality of second-type identifiers. A type of the first-type identifier is different from a type of the second-type identifier. A network device or a link identified by the first-type identifier is on a first network. A network device or a link identified by the second-type identifier is on a second network. A type of the first network is different from a type of the second network. The second network device is further configured to send the second packet.

Optionally, when the network system includes the controller, the segment list is the segment list sent by the controller and received by the second network device. Optionally, when the network system does not include the controller, that the second network device obtains the segment list means that the second network device generates the segment list.

The first network device is configured to receive a second packet from a first network. A first packet header of the second packet includes a segment list. The segment list includes a plurality of sequentially arranged identifiers. Each of the plurality of identifiers is used to identify one network device or one link. The plurality of identifiers include at least one first-type identifier and a plurality of second-type identifiers. A type of the first-type identifier is different from a type of the second-type identifier. A network device or a link identified by the first-type identifier is on a first network. A network device or a link identified by the second-type identifier is on a second network. A type of the first network is different from a type of the second network. The first network device is further configured to: encapsulate a second packet header for the second packet to form a third packet, where the second packet header includes the plurality of second-type identifiers; and send the third packet to the second network.

An embodiment further provides a non-transient storage medium configured to store a software instruction used in the foregoing embodiments. The non-transient storage medium includes a program used to perform the methods shown in the foregoing embodiments. When the program is executed on a computer or a network device, the computer or the network device is enabled to perform the methods in the foregoing method embodiments.

An embodiment further provides a computer program product including a computer program instruction. When the computer program product runs on a computer, the computer is enabled to perform the methods in the foregoing method embodiments.

"First" in the first packet and the first network device that are mentioned in the embodiments is merely used as a name identifier, and does not represent the first in sequence. The rule also applies to "second", "third", "fourth", and the like. However, "first" in the first identifier mentioned in the embodiments represents the first in sequence. The rule also applies to "Nth".

In the embodiments, it is considered that "A and/or B" includes three cases: only A, only B, and both A and B.

It should be noted that any apparatus embodiment described above is merely an example. The units described as separate parts may or may not be physically separate, and parts displayed as units may or may not be physical units, may be located at one location, or may be distributed on a plurality of network units. Some or all the modules may be selected based on an actual need to achieve the objectives of the solutions of the embodiments. In addition, in accompanying drawings of embodiments of the network device or the host, connection relationships between modules indicate that the modules have communication connections with each other, which may be specifically implemented as one or more communications buses or signal cables. A person of ordinary skill in the art may understand and implement the embodiments without creative efforts.

Methods or algorithm steps described in combination with the content disclosed in the embodiments may be implemented by hardware, or may be implemented by a processor by executing a software instruction. The software instruction may include a corresponding software module. The software module may be stored in a RAM, a flash memory, a ROM, an EPROM, and EEPROM, a hard disk, a mobile hard disk, a compact disc, or any other form of storage medium well-known in the art. The storage medium is coupled to a processor, so that the processor can read information from the storage medium. Certainly, the storage medium may be a component of the processor.

The objectives, technical solutions, and benefits of the present disclosure are further described in detail in the foregoing specific embodiments. It should be understood that the foregoing descriptions are merely specific embodiments, but are not intended to limit the protection scope of the present disclosure. Any modification, replacement, or improvement made based on the technical solutions of the present disclosure shall fall within the protection scope of the present disclosure.

What is claimed is:

1. A method implemented by a segment routing device, the method comprising:
   receiving a first packet from a first network, wherein the first packet comprises a first packet header, wherein the first packet header comprises a segment list, wherein the segment list comprises sequentially arranged identifiers, wherein the sequentially arranged identifiers comprise a first-type identifier and second-type identifiers, wherein a type of the first-type identifier is different from a type of the second-type identifiers, wherein the first-type identifier identifies a first network device or a first link in the first network, wherein the second-type identifiers identify a second network device or a second link in a second network, wherein a type of the first network is different from a type of the second network, wherein the second-type identifiers are adjacent to each other, wherein the first-type identifier is located before or after the second-type identifiers in the segment list, and wherein the segment list comprises an indication identifier indicating a start location of the second-type identifiers;
   encapsulating a second packet header for the first packet to generate a second packet, wherein the second packet header comprises the second-type identifiers; and
   sending the second packet to the second network.

2. The method of claim 1, wherein the first-type identifier comprises a segment identifier whose length is 128 bits or comprises a compressed segment identifier whose length is less than 128 bits.

3. The method of claim 2, wherein the indication identifier is located after the first-type identifier and before the second-type identifiers in the segment list, and wherein the indication identifier and the compressed segment identifier have a same length.

4. The method of claim 1, wherein the second-type identifiers comprise a first identifier, wherein the first-type identifier is an end segment identifier comprising the indication identifier, and wherein the end segment identifier is located adjacent to and before the first identifier.

5. The method of claim 4, wherein the end segment identifier comprises a function field, wherein the function field comprises the indication identifier, and wherein the indication identifier identifies a function on a Segment Routing with IPv6 data plane (SRv6) network.

6. The method of claim 1, wherein the second-type identifiers are adjacent to each other and comprise a Multiprotocol Label Switching (MPLS) label, wherein the second packet header is an MPLS packet header, and wherein the second network is an MPLS network.

7. The method of claim 6, wherein the first packet further comprises an end identifier, and wherein the method further comprises determining a last identifier in the second-type identifiers based on the end identifier.

8. The method of claim 1, wherein the first packet further comprises a quantity identifier, and wherein the method further comprises determining a quantity of identifiers in the second-type identifiers based on the quantity identifier.

9. The method of claim 1, wherein the second-type identifiers comprise a source identifier and a destination identifier, wherein the second packet header is an Internet Protocol version 4 (IPv4) packet header, wherein the second network is an IPv4 network, wherein the source identifier corresponds to a source address of an IPv4 tunnel, wherein the destination identifier corresponds to a destination address of the IPv4 tunnel, and wherein the IPv4 tunnel is for forwarding the second packet.

10. The method of claim 9, wherein the segment list comprises a type identifier indicating a type of the IPv4 tunnel.

11. The method of claim 1, wherein the first packet further comprises a pointer, and wherein the method further comprises determining a location of a first identifier in the second-type identifiers in the segment list based on the pointer.

12. The method of claim 1, wherein the segment list comprises an element whose length is 128 bits, and wherein the second-type identifiers begin at a start position of the element.

13. The method of claim 1, wherein the second packet comprises an Internet Protocol version 6 (IPv6) packet header, wherein the IPv6 packet header comprises a destination address field, and wherein the method further comprises adding a cross-domain identifier to the destination address field, wherein the cross-domain identifier is the first-type identifier, and wherein the cross-domain identifier is a segment identifier whose length is 128 bits or is a compressed segment identifier whose length is less than 128 bits.

14. A method implemented by a controller, the method comprising:
   determining a forwarding path of a packet, wherein the forwarding path comprises network devices located in a plurality of networks comprising a first network and a second network, and wherein a type of the first network is different from a type of the second network;
   generating a segment list corresponding to the forwarding path, wherein the segment list comprises sequentially arranged identifiers, wherein the sequentially arranged identifiers comprise a first-type identifier and second-type identifiers, wherein a type of the first-type identifier is different from a type of the second-type identifiers, wherein the first-type identifier identifies a first network device or a first link in the first network, wherein the second-type identifiers identify a second network device or a second link in the second network, wherein the second-type identifiers are adjacent to each other, wherein the first-type identifier is located before or after the second-type identifiers in the segment list, and wherein the segment list comprises an indication identifier indicating a start location of the second-type identifiers; and
   sending the segment list to an ingress device on the forwarding path.

15. A network device comprising:
a memory configured to store instructions; and
one or more processors coupled to the memory and configured to execute the instructions to:
   receive a first packet from a first network, wherein the first packet comprises a first packet header, wherein the first packet header comprises a segment list, wherein the segment list comprises sequentially arranged identifiers, wherein the sequentially arranged identifiers comprise a first-type identifier and second-type identifiers, wherein a type of the first-type identifier is different from a type of the second-type identifiers, wherein the first-type identifier identifies a first network device or a first link in the first network, wherein the second-type identifiers identify a second network device or a second link in a second network, and wherein a type of the first network is different from a type of the second network, wherein the second-type identifiers are adjacent to each other, wherein the first-type identifier is located before or after the second-type identifiers in the segment list, and wherein the segment list comprises an indication identifier indicating a start location of the second-type identifiers;
   encapsulate a second packet header for the first packet to generate a second packet, wherein the second packet header comprises the second-type identifiers; and
   send the second packet to the second network.

16. The network device of claim 15, wherein the first-type identifier comprises a segment identifier whose length is 128 bits or comprises a compressed segment identifier whose length is less than 128 bits.

17. The network device of claim 15, wherein the first-type identifier comprises a segment identifier or a compressed segment identifier.

18. The network device of claim 17, wherein the indication identifier is located after the first-type identifier and before the second-type identifiers in the segment list, and wherein the indication identifier and the compressed segment identifier have a same length.

19. The network device of claim 17, wherein the second-type identifiers comprise a first identifier, wherein the first-type identifier is an end segment identifier comprising the indication identifier, and wherein the end segment identifier is located adjacent to and before the first identifier.

20. The network device of claim 19, wherein the end segment identifier comprises a function field, wherein the function field comprises the indication identifier, and wherein the indication identifier identifies a function on a Segment Routing with IPv6 data plane (SRv6) network.

21. The network device of claim 15, wherein the second-type identifiers are adjacent to each other and comprise a Multiprotocol Label Switching (MPLS) label, wherein the second packet header is an MPLS packet header, and wherein the second network is an MPLS network.

22. The network device of claim 21, wherein the first packet further comprises an identifier, and wherein the one or more processors are further configured to determine a last identifier in the second-type identifiers based on the identifier.

23. The network device of claim 15, wherein the second-type identifiers comprise a source identifier, and a destination identifier, wherein the second packet header is an Internet Protocol version 4 (IPv4) packet header, wherein the second network is an IPv4 network, wherein the source identifier corresponds to a source address of an IPv4 tunnel, wherein the destination identifier corresponds to a destination address of the IPv4 tunnel, and wherein the IPv4 tunnel is for forwarding the second packet.

24. The network device of claim 23, wherein the segment list comprises a type identifier indicating a type of the IPv4 tunnel.

25. The network device of claim 15, wherein the first packet further comprises a pointer, and wherein the one or more processors are further configured to determine a location of a first identifier in the second-type identifiers in the segment list based on the pointer.

26. The network device of claim 25, wherein the segment list comprises an element whose length is 128 bits, and wherein the second-type identifiers begin at a start position of the element.

27. The network device of claim 15, wherein the second packet comprises an Internet Protocol version 6 (IPv6) packet header, wherein the IPv6 packet header comprises a destination address field, and wherein the one or more processors are further configured to add a cross-domain identifier to the destination address field, wherein the cross-domain identifier is the first-type identifier, and wherein the cross-domain identifier is a segment identifier whose length is 128 bits or is a compressed segment identifier whose length is less than 128 bits.

28. The method of claim 14, wherein the first-type identifier comprises a segment identifier whose length is 128 bits or comprises a compressed segment identifier whose length is less than 128 bits.

29. The method of claim 28, wherein the indication identifier is located after the first-type identifier and before the second-type identifiers in the segment list, and wherein the indication identifier and the compressed segment identifier have a same length.

30. The method of claim 14, wherein the second-type identifiers comprise a first identifier, wherein the first-type identifier is an end segment identifier comprising the indication identifier, and wherein the end segment identifier is located adjacent to and before the first identifier.

* * * * *